United States Patent
Nagai et al.

(10) Patent No.: US 12,246,684 B2
(45) Date of Patent: Mar. 11, 2025

(54) VEHICLE CLEANER SYSTEM

(71) Applicant: KOITO MANUFACTURING CO., LTD., Tokyo (JP)

(72) Inventors: Hikaru Nagai, Shizuoka (JP); Akinobu Kubota, Shizuoka (JP); Kazuki Kawamura, Shizuoka (JP); Toshihisa Hayami, Shizuoka (JP); Yusuke Funami, Shizuoka (JP); Yoshio Ito, Shizuoka (JP); Kazuhiro Suzuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 779 days.

(21) Appl. No.: 17/427,411

(22) PCT Filed: Jan. 7, 2020

(86) PCT No.: PCT/JP2020/000160
§ 371 (c)(1),
(2) Date: Jul. 30, 2021

(87) PCT Pub. No.: WO2020/162085
PCT Pub. Date: Aug. 13, 2020

(65) Prior Publication Data
US 2022/0097658 A1    Mar. 31, 2022

(30) Foreign Application Priority Data

Feb. 4, 2019  (JP) ................................. 2019-017922
Feb. 4, 2019  (JP) ................................. 2019-017923
(Continued)

(51) Int. Cl.
*B60S 1/56*   (2006.01)
*B60S 1/46*   (2006.01)
(Continued)

(52) U.S. Cl.
CPC . *B60S 1/56* (2013.01); *B60S 1/46* (2013.01); *B60S 1/48* (2013.01); *B60S 1/481* (2013.01); *B60S 1/60* (2013.01)

(58) Field of Classification Search
CPC .... B60S 1/56; B60S 1/481; B60S 1/46; B60S 1/60; B60S 1/48
(Continued)

(56) References Cited

U.S. PATENT DOCUMENTS

| 6,615,438 B1 | 9/2003 | Franco et al. |
| 10,173,646 B1 | 1/2019 | Rice et al. |

(Continued)

FOREIGN PATENT DOCUMENTS

| CN | 1268089 A | 9/2000 |
| CN | 102951124 A | 3/2013 |

(Continued)

OTHER PUBLICATIONS

WO2019022038A1—machine translation (Year: 2019).*
(Continued)

*Primary Examiner* — Tinsae B Ayalew
(74) *Attorney, Agent, or Firm* — Sughrue Mion, PLLC

(57) ABSTRACT

A vehicle cleaner system includes a cleaner unit discharges a cleaning fluid toward a cleaning target mounted on a vehicle; a motor pump supplies the cleaning fluid to the cleaner unit; a normally closed type solenoid valve provided between the cleaner unit and the motor pump and switches between permission and non-permission of movement of the cleaning fluid from the motor pump to the cleaner unit; and a cleaner control unit controls the motor pump and the solenoid valve. The cleaner control unit sets an operation stop time period for stopping an operation of at least one of the motor pump and the solenoid valve, and after the cleaning fluid is discharged to the cleaning target, stops the
(Continued)

operation of at least one of the motor pump and the solenoid valve during the operation stop time period based on a predetermined condition.

1 Claim, 14 Drawing Sheets

(30) Foreign Application Priority Data

Feb. 4, 2019 (JP) .................................. 2019-017924
Feb. 4, 2019 (JP) .................................. 2019-017925

(51) Int. Cl.
*B60S 1/48* (2006.01)
*B60S 1/60* (2006.01)

(58) Field of Classification Search
USPC ...................................... 239/284.2; 134/57 R
See application file for complete search history.

(56) References Cited

U.S. PATENT DOCUMENTS

| | | | |
|---|---|---|---|
| 2003/0047621 A1 | 3/2003 | Fukushima | |
| 2004/0045587 A1 | 3/2004 | Franco et al. | |
| 2005/0177969 A1 | 8/2005 | Franco et al. | |
| 2005/0284503 A1 | 12/2005 | Franco et al. | |
| 2007/0094832 A1 | 5/2007 | Franco et al. | |
| 2009/0014035 A1 | 1/2009 | Franco et al. | |
| 2013/0037627 A1 | 2/2013 | Kikuta et al. | |
| 2016/0025212 A1 | 1/2016 | Kawamoto | |
| 2017/0001602 A1 | 1/2017 | Oka et al. | |
| 2018/0015907 A1 | 1/2018 | Rice | |
| 2018/0334140 A1 | 11/2018 | Ghannam et al. | |
| 2019/0009752 A1* | 1/2019 | Rice | B60S 1/56 |
| 2020/0139939 A1 | 5/2020 | Kubota et al. | |
| 2020/0207312 A1 | 7/2020 | Kamiya et al. | |

FOREIGN PATENT DOCUMENTS

| | | |
|---|---|---|
| CN | 104995439 A | 10/2015 |
| CN | 106314375 A | 1/2017 |
| FR | 2090585 A5 | 1/1972 |
| GB | 1 337 172 A | 11/1973 |
| JP | 56-146650 U | 11/1981 |
| JP | 7-186895 A | 7/1995 |
| JP | 7-251731 A | 10/1995 |
| JP | 11-285672 A | 10/1999 |
| JP | 2001-171491 A | 6/2001 |
| JP | 2002-21887 A | 1/2002 |
| JP | 2003-137076 A | 5/2003 |
| JP | 2017-13781 A | 1/2017 |
| WO | 2018/230558 A1 | 12/2018 |
| WO | 2019/022038 A1 | 1/2019 |

OTHER PUBLICATIONS

International Search Report (PCT/ISA/210) dated Mar. 10, 2020 issued by the International Searching Authority in International Application No. PCT/JP2020/000160.
Written Opinion (PCT/ISA/237) dated Mar. 10, 2020 issued by the International Searching Authority in International Application No. PCT/JP2020/000160.
Partial Supplementary European Search Report dated Feb. 25, 2022, issued by the European Patent Office in counterpart European Patent Application No. 20752061.0.
Communication issued on Jun. 28, 2024 by the China National Intellectual Property Administration for Chinese Patent Application No. 202080012406.5.
Office Action issued Nov. 21, 2024 by the China State Intellectual Property Administration in Chinese Patent Application No. 202080012406.5.

* cited by examiner

| MODE | 1 | 2 | 3 | 4 | 5 | 6 | 7 | 8 | 9 | 10 |
|---|---|---|---|---|---|---|---|---|---|---|
| A (STANDARD) | FRONT WW 101 | REAR WW 102 | FRONT LC 103 | REAR LC 104 | RIGHT LC 105 | LEFT LC 106 | RIGHT HC 107 | LEFT HC 108 | FRONT CC 109a | REAR CC 109b |
| B (FORWARD MOVEMENT) | FRONT WW 101 | FRONT LC 103 | FRONT CC 109a | RIGHT LC 105 | LEFT LC 106 | RIGHT HC 107 | LEFT HC 108 | REAR WW 102 | REAR LC 104 | REAR CC 109b |
| C (REVERSE MOVEMENT) | REAR WW 102 | REAR LC 104 | REAR CC 109b | RIGHT LC 105 | LEFT LC 106 | RIGHT HC 107 | LEFT HC 108 | FRONT WW 101 | FRONT LC 103 | FRONT CC 109a |
| D (RAINY WEATHER (AUTOMATIC DRIVING)) | FRONT CC 109a | REAR CC 109b | FRONT LC 103 | REAR LC 104 | RIGHT LC 105 | LEFT LC 106 | RIGHT HC 107 | LEFT HC 108 | FRONT WW 101 | REAR WW 102 |

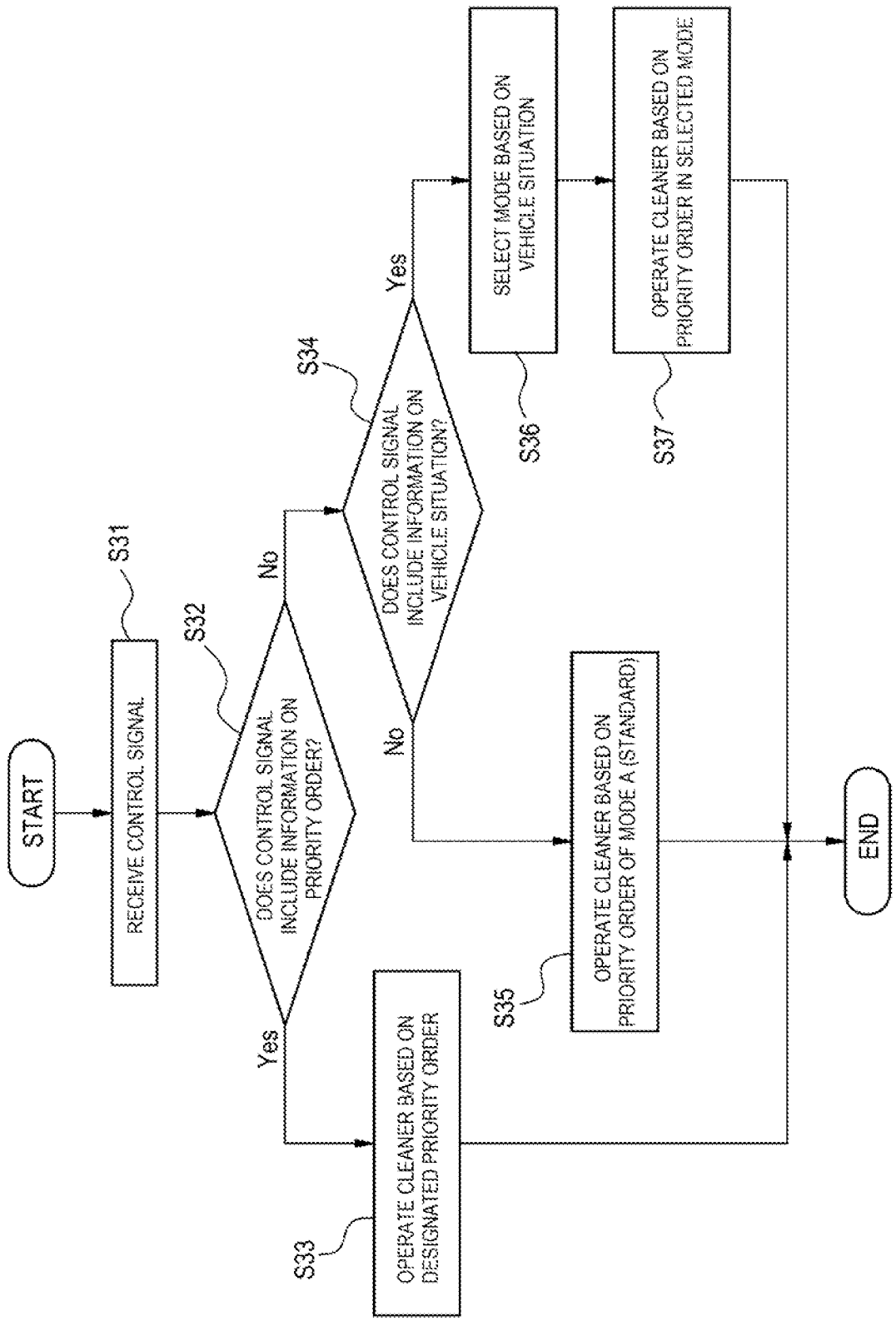

VEHICLE CLEANER SYSTEM

TECHNICAL FIELD

The present disclosure relates to a vehicle cleaner system.

BACKGROUND ART

In recent years, cameras have been mounted on vehicles. The camera outputs acquired information to a vehicle ECU or the like that controls an own vehicle. A vehicle cleaner capable of cleaning such a camera with a cleaning fluid is known in Patent Literature 1 and the like.

CITATION LIST

Patent Literature

Patent Literature 1: JP2001-171491A

SUMMARY OF INVENTION

Technical Problem

A plurality of cameras and sensors are mounted on a vehicle. It is conceivable to clean the plurality of cameras and sensors with the vehicle cleaner described above. In this case, a vehicle cleaner system including a plurality of vehicle cleaners may be integrated and mounted on a vehicle.

The vehicle cleaner system includes a motor pump that supplies a cleaning fluid to the cleaners and solenoid valves provided between the cleaners and the motor pump. However, there is room for improvement in measures to prevent overheating of these components.

Therefore, the present disclosure provides a vehicle cleaner system capable of preventing deterioration due to overheating of a motor pump or a solenoid valve and infinite cleaning.

In addition, there is room for improvement in a control mode for efficiently cleaning a plurality of cleaning targets by the vehicle cleaner system.

Therefore, the present disclosure provides a vehicle cleaner system capable of efficiently cleaning a plurality of cleaning targets in a short time, and a vehicle cleaner system capable of cleaning a plurality of cleaning targets in a suitable order.

In addition, the vehicle cleaner system includes a motor pump that supplies a cleaning fluid to a cleaner and a solenoid valve provided between the cleaner and the motor pump. However, there is room for improvement in preventing failure of the solenoid valve and miniaturization.

Therefore, the present disclosure provides a vehicle cleaner system capable of preventing failure of a solenoid valve and miniaturization.

Solution to Problem

In order to achieve the above object, a vehicle cleaner system according to one aspect of the present disclosure includes:
  a cleaner unit configured to discharge a cleaning fluid toward a cleaning target mounted on a vehicle;
  a motor pump configured to supply the cleaning fluid to the cleaner unit;
  a normally closed type solenoid valve provided between the cleaner unit and the motor pump and configured to switch between permission and non-permission of movement of the cleaning fluid from the motor pump to the cleaner unit; and
  a cleaner control unit configured to control the motor pump and the solenoid valve.

The cleaner control unit sets an operation stop time period for stopping an operation of at least one of the motor pump and the solenoid valve, and after the cleaning fluid is discharged to the cleaning target, stops the operation of at least one of the motor pump and the solenoid valve during the operation stop time period based on a predetermined condition.

According to the vehicle cleaner system of the present disclosure, by providing the operation stop time period for stopping discharge of the cleaning fluid by a cleaner after the motor pump and the solenoid valve are operated and the cleaning fluid is discharged to the cleaning target, heat dissipation properties of at least one of the motor pump and the solenoid valve can be improved, and deterioration of the motor pump and the solenoid valve due to overheating can be prevented. In addition, infinite continuation of cleaning can be prevented. The infinite continuation of cleaning might be occurred by determining that the cleaning fluid remains on the cleaning target as dirt.

In the vehicle cleaner system according to the present disclosure, the cleaner control unit may set the operation slop time period to be longer than a continuous supply time period of the cleaning fluid by the motor pump or a continuous permission time period of the movement of the cleaning fluid by the solenoid valve.

According to this configuration, by setting the operation slop time period longer than a continuous operable time period of the motor pump or the solenoid valve, overheating of the motor pump or the solenoid valve can be more reliably prevented.

In the vehicle cleaner system according to the present disclosure, the predetermined condition may include that at least one of the number of operations of the motor pump and the number of operations of the solenoid valve is equal to or greater than a predetermined number of times.

According to this configuration, by providing the operation stop time period when at least one of the number of operations of the motor pump and the number of operations of the solenoid valve is equal to or greater than the predetermined number of times, overheating of the motor pump or the solenoid valve can be suitably prevented.

In the vehicle cleaner system according to the present disclosure, the predetermined condition may include completion of one operation of at least one of the motor pump and the solenoid valve.

According to this configuration, by providing the operation stop time period every time the motor pump or the solenoid valve is operated, overheating of the motor pump or the solenoid valve can be more reliably prevented.

In the vehicle cleaner system according to the present disclosure, a plurality of cleaner units may be provided and the solenoid valve may be provided between the motor pump and each of the cleaner units, and the cleaner control unit may sequentially operate the solenoid valves in conjunction with the operation of the motor pump such that timings of operations of the solenoid valves do not overlap.

By sequentially operating the solenoid valves, waste of standby time for a start of the operation of the motor pump until a start of the operations of the solenoid valves can be prevented, for example, when the operation stop time period of the solenoid valves is longer than the operation stop time period of the motor pump. When the cleaning fluid is supplied to the cleaner units at the same time, a water pressure of the cleaning fluid decreases, which may lead to a decrease in cleaning performance. According to this configuration, the cleaning fluid is not simultaneously supplied to the plurality of cleaner units, and the cleaning performance can be maintained.

In order to achieve the above object, a vehicle cleaner system according to one aspect of the present disclosure includes:
  a plurality of cleaner units configured to discharge a cleaning fluid toward cleaning targets mounted on a vehicle;
  a motor pump configured to supply the cleaning fluid to the plurality of cleaner units;
  a plurality of normally closed type solenoid valves each provided between each of the plurality of cleaner units and the motor pump and configured to switch between permission and non-permission of movement of the clearing fluid from the motor pump to each of the plurality of cleaner units; and
  a cleaner control unit configured to control the motor pump and the plurality of solenoid valves.

The cleaner control unit sets a priority order of an operation order of the solenoid valves corresponding to the plurality of cleaner units according to attributes of the plurality of cleaner units, sets a cleaning prohibition time period for stopping cleaning of each of the plurality of cleaner units, and when an instruction signal for permitting cleaning of two or more cleaner units including a first cleaner unit among the plurality of cleaner units is received during the cleaning prohibition time period associated with the first cleaner unit, permits an operation of the solenoid valve corresponding to at least one cleaner unit having the highest priority among the two or more cleaner units except for the first cleaner unit.

In order to prevent overheating of the solenoid valve and deterioration of functions of the cleaning target, the cleaning prohibition time period for stopping the cleaning of each cleaner unit may be set. However, when cleaning of all the cleaner units is stopped during the cleaning prohibition time period of each cleaner unit, the time until cleaning of all the cleaner units is completed increases. Therefore, according to the vehicle cleaner system of the present disclosure, even during the cleaning prohibition time period of one cleaner unit among the plurality of cleaner units, the operation of the solenoid valve having the next highest priority is permitted, so that the plurality of cleaning targets can be efficiently cleaned in a short time.

In the vehicle cleaner system according to the present disclosure, the cleaner control unit may set an operation stop time period for stopping an operation of the motor pump, and after the operation stop time period has elapsed, permit the operation of the solenoid valve corresponding to at least one cleaner unit having the highest priority.

According to this configuration, by permitting the operation of the solenoid valve corresponding to another cleaner unit after the operation stop time period for waiting for heat radiation of the motor pump has elapsed, it is possible to efficiently clean the plurality of cleaning targets while preventing overheating of the motor pump.

In the vehicle cleaner system according to the present disclosure, the cleaner control unit may permit operations of the solenoid valves such that timings of the operations of the solenoid valves do not overlap.

When the cleaning fluid is simultaneously supplied to the plurality of cleaner units, a water pressure of the cleaning fluid may decrease, which may lead to a decrease in cleaning performance. Therefore, it is preferable that the timings of the operations of the plurality of solenoid valves do not overlap.

In order to achieve the above object, a vehicle cleaner system according to one aspect of the present disclosure includes:
  a plurality of cleaner units configured to discharge a cleaning fluid toward cleaning targets mounted on a vehicle;
  a motor pump configured to supply the cleaning fluid to the plurality of cleaner units;
  a plurality of solenoid valves each provided between each of the plurality of cleaner units and the motor pump and configured to switch between permission and non-permission of movement of the cleaning fluid from the motor pump to each of the plurality of cleaner units; and
  a cleaner control unit configured to control the motor pump and the plurality of solenoid valves.

The cleaner control unit controls operations of the plurality of solenoid valves based on one of a first priority order set by a vehicle control unit that controls the vehicle in order to determine an operation order of the plurality of cleaner units and a second priority order set by the cleaner control unit in order to determine an operation order of the plurality of cleaner units.

According to the vehicle cleaner system of the present disclosure, the priority order of cleaning of the plurality of cleaner units can be changed according to the system mounted on the vehicle, a situation of the vehicle, and the like. Thereby, the plurality of cleaning targets can be cleaned in a suitable operation order.

In the vehicle cleaner system according to the present disclosure, the cleaner control unit may prioritize the first priority order over the second priority order when there is the first priority order, and select the second priority order when there is no first priority order or when cleaning of the plurality of cleaner units is designated at the same priority by the vehicle control unit.

According to this configuration, by preferentially selecting the first priority order set by the vehicle control unit that controls the entire vehicle over the second priority order, cleaning can be performed in the operation order according to the situation of the entire vehicle.

In the vehicle cleaner system according to the present disclosure, the second priority order may include a plurality of priority orders in which the operation orders are different from each other according to the situation of the vehicle, and the cleaner control unit may select one of the plurality of priority orders according to information on the situation received from the vehicle control unit.

According to this configuration, efficient cleaning can be performed by selecting a suitable priority order among the plurality of second priority orders according to the vehicle situation.

In the vehicle cleaner system according to the present disclosure, the cleaner control unit may permit the operations of the solenoid valves such that timings of the operations of the solenoid valves do not overlap when the solenoid valves are operated based on the first priority order or the second priority order.

When the cleaning fluid is simultaneously supplied to the plurality of cleaner units, a water pressure of the cleaning fluid may decrease, which may lead to a decrease in cleaning performance. Therefore, it is preferable that the timings of the operations of the plurality of solenoid valves do not overlap.

In order to achieve the above object, a vehicle cleaner system according to one aspect of the present disclosure includes:
- a cleaner unit configured to discharge a cleaning fluid toward a cleaning target mounted on a vehicle;
- a motor pump configured to supply the cleaning fluid to the cleaner unit;
- a normally closed type solenoid valve provided between the cleaner unit and the motor pump and configured to switch between permission and non-permission of movement of the cleaning fluid from the motor pump to the cleaner unit; and
- a cleaner control unit configured to control the motor pump and the solenoid valve.

The cleaner control unit starts an operation of the motor pump after a certain time period has elapsed since an opening operation of the solenoid valve is started.

When the motor pump is operated before the solenoid valve is opened, an internal pressure in a pipe between the motor pump and the solenoid valve increases, which may lead to damage or water leakage of the solenoid valve. In addition, the solenoid valve has to be enlarged for pressure resistance. In contrast, according to the vehicle cleaner system of the present disclosure, since an increase in the internal pressure can be prevented by starting the operation of the motor pump after opening the solenoid valve, damage to the solenoid valve can be prevented even when the solenoid valve is miniaturized.

In the vehicle cleaner system according to the present disclosure, the certain time period may be from when the opening operation of the solenoid valve is started to when the opening operation is completed.

According to this configuration, by starting the operation of the motor pump after the opening operation of the solenoid valve is completed, miniaturization of the solenoid valve can be promoted and damage to the solenoid valve can be more reliably prevented.

In order to achieve the above object, a vehicle cleaner system according to one aspect of the present disclosure includes:
- a cleaner unit configured to discharge a cleaning fluid toward a cleaning target mounted on a vehicle;
- a motor pump configured to supply the cleaning fluid to the cleaner unit;
- a normally closed type solenoid valve provided between the cleaner unit and the motor pump and configured to switch between permission and non-permission of movement of the cleaning fluid from the motor pump to the cleaner unit; and
- a cleaner control unit configured to control the motor pump and the solenoid valve.

The cleaner control unit starts a closing operation of the solenoid valve after a certain time period has elapsed since an operation of the motor pump is stopped after an opening operation of the solenoid valve is started and the operation of the motor pump is started.

If the solenoid valve is closed before the operation of the motor pump is stopped in a state in which the motor pump and the solenoid valve are operated, an internal pressure in a pipe between the motor pump and the solenoid valve increases, which may lead to damage or water leakage of the solenoid valve. In addition, the solenoid valve has to be enlarged for pressure resistance. In contrast, according to the vehicle cleaner system of the present disclosure, an increase in the internal pressure can be prevented by closing the solenoid valve after stopping the operation of the motor pump, the damage to the solenoid valve can be prevented even when the solenoid valve is miniaturized.

In the vehicle cleaner system according to the present disclosure, the cleaner unit may include a nozzle configured to inject the cleaning fluid toward the cleaning target by a discharge pressure of the motor pump and stop injection of the cleaning fluid when the discharge pressure is lost, and the certain time period may be from when the operation of the motor pump is stopped to when a residual pressure due to inertia with respect to the nozzle becomes normal.

When the solenoid valve is closed simultaneously with a stop of the operation of the motor pump or immediately after the stop of the operation of the motor pump, the internal pressure in the pipe between the motor pump and the solenoid valve increases due to a residual pressure due to a inertial force, which may lead to damage or water leakage of the solenoid valve, and the solenoid valve has to be enlarged. Therefore, it is preferable to close the solenoid valve after the residual pressure becomes normal after the motor pump is stopped.

In the vehicle cleaner system according to the present disclosure, the cleaner unit may include a cylinder, a piston supported so as to be capable of advancing and retracting with respect to the cylinder, and a nozzle provided at a tip end of the piston and configured to inject the cleaning fluid toward the cleaning target in a state in which the piston protrudes from the cylinder, the piston may protrude from the cylinder when the motor pump is operated, and is accommodated in the cylinder when the operation of the motor pump is stopped, and the certain time period may be from when the operation of the motor pump is stopped to when accommodation of the piston in the cylinder is completed.

In a case of a pop-up type nozzle, when the internal pressure increases due to the operation of the motor pump, the piston including the nozzle at the tip end thereof protrudes from the cylinder, and when the operation of the motor pump is stopped, the internal pressure decreases and the piston is accommodated in the cylinder. However, when the solenoid valve is closed before the piston is completely accommodated in the cylinder, the internal pressure may not completely decrease and the piston may not be sufficiently accommodated in the cylinder. Therefore, by starting the closing operation of the solenoid valve after the piston including the nozzle at the tip end thereof is accommodated in the cylinder, accommodation of the piston in the cylinder due to the slop of the operation of the motor pump can be sufficiently ensured.

In the vehicle cleaner system according to the present disclosure, a plurality of cleaner units may be provided and the solenoid valve may be provided between the motor pump and each of the cleaner units, and the cleaner control unit may sequentially operate the solenoid valves in conjunction with the operation of the motor pump such that timings of operations of the solenoid valves do not overlap.

When the cleaning fluid is simultaneously supplied to the cleaner units, a water pressure of the cleaning fluid may decreases, which may lead to a decrease in cleaning performance. According to this configuration, the cleaning fluid is not simultaneously supplied to the plurality of cleaner units, and the cleaning performance can be maintained.

Advantageous Effects of the Invention

According to the present disclosure, there is provided a vehicle cleaner system capable of preventing deterioration due to overheating of a motor pump or a solenoid valve and infinite cleaning.

According to the present disclosure, there is provided a vehicle cleaner system capable of efficiently cleaning a plurality of cleaning targets in a short time.

According to the present disclosure, there is provided a vehicle cleaner system capable of cleaning a plurality of cleaning targets in a suitable order.

According to the present disclosure, there is provided a vehicle cleaner system capable of preventing failure of a solenoid valve and reducing miniaturization.

BRIEF DESCRIPTION OF DRAWINGS

FIG. 12 is a view showing a priority order table stored in a cleaner control unit in a third embodiment.

FIG. 13 is a flowchart showing an example of processing executed by the cleaner control unit according to the third embodiment.

DESCRIPTION OF EMBODIMENTS

Figure 1:
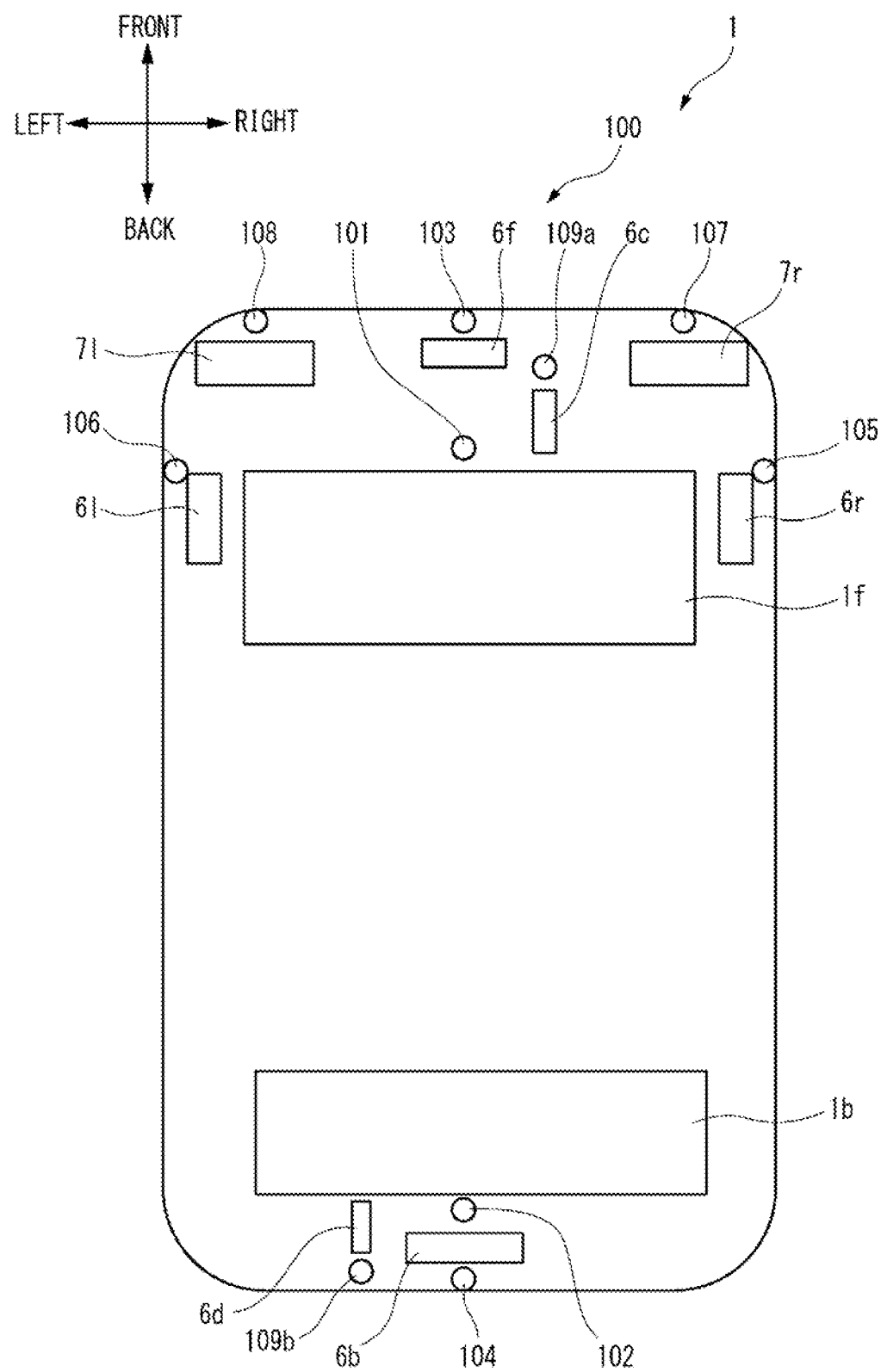
FIG. 1 is a top view of a vehicle on which a cleaner system is mounted.

Hereinafter, embodiments of the present disclosure will be described with reference to the drawings. Incidentally, in description of the present embodiment, members having the same reference numerals as those already described are not described for convenience of description. Dimensions of members shown in the drawings may be different from actual dimensions thereof for convenience of description.

In the description of the present embodiment, a "left-right direction", a "front-rear direction" and an "upper-lower direction" will be appropriately referred to for convenience of description. These directions are relative directions set for a vehicle 1 shown in FIG. 1. Here, the "upper-lower direction" is a direction including an "upper direction" and a "lower direction". The "front-rear direction" is a direction including a "front direction" and a "rear direction". The "left-right direction" is a direction including a "left direction" and a "right direction".

FIG. 1 is a top view of the vehicle 1 on which a vehicle cleaner system 100 (hereinafter referred to as a cleaner system 100) according to the present embodiment is mounted. The vehicle 1 includes the cleaner system 100. In the present embodiment, the vehicle 1 is an automobile that can travel in an automatic driving mode.

Figure 2:
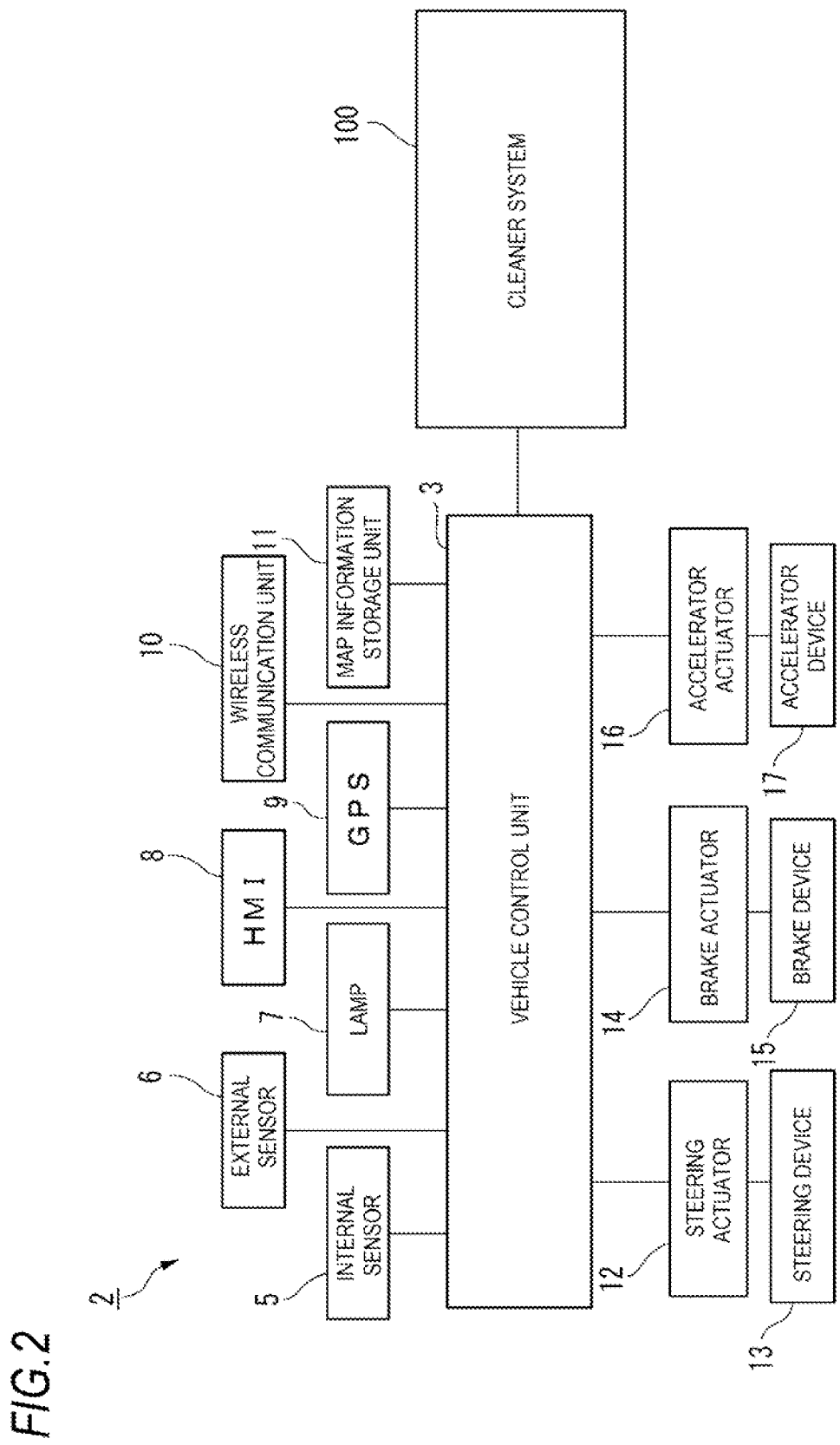
FIG. 2 is a block diagram of a vehicle system.

First, a vehicle system 2 of the vehicle 1 will be described with reference to FIG. 2. FIG. 2 is a block diagram of the vehicle system 2. As shown in FIG. 2, the vehicle system 2 includes a vehicle control unit 3, an internal sensor 5, an external sensor 6, a lamp 7, a human machine interface (HMI) 8, a global positioning system (GPS) 9, a wireless communication unit 10 and a map information storage unit 11. The vehicle system 2 further includes a steering actuator 12, a steering device 13, a brake actuator 14, a brake device 15, an accelerator actuator 16 and an accelerator device 17.

The vehicle control unit 3 is configured by an electronic control unit (ECU). The vehicle control unit 3 includes a processor such as a central processing unit (CPU), a read only memory (ROM) in which various vehicle control programs are stored, and a random access memory (RAM) in which various types of vehicle control data are temporarily stored. The processor is configured to develop a program designated from the various vehicle control programs stored in the ROM on the RAM and execute various types of processing in cooperation with the RAM. The vehicle control unit 3 is configured to control traveling of the vehicle 1.

The internal sensor 5 is a sensor that can acquire information on an own vehicle.

The internal sensor 5 is at least one of an acceleration sensor, a speed sensor, a wheel speed sensor, a gyro sensor and the like. The internal sensor 5 is configured to acquire the information on the own vehicle including a traveling state of the vehicle 1 and output the information to the vehicle control unit 3.

The internal sensor 5 may include a seating sensor that detects whether a driver is seated on a driver seat, a face orientation sensor that detects an orientation of a face of the driver, a human sensor that detects whether there is a person in the vehicle, and the like.

The external sensor 6 is a sensor that can acquire information outside the own vehicle. The external sensor is at least one of a camera, a radar, a LiDAR and the like. The external sensor 6 is configured to acquire information outside the own vehicle including a surrounding environment of the vehicle 1 (another vehicle, a pedestrian, a road shape, a traffic sign, an obstacle and the like) and output the information to the vehicle control unit 3. Alternatively, the external sensor 6 may include a weather sensor that detects a weather condition, an illuminance sensor that detects illuminance of the surrounding environment of the vehicle 1, and the like.

For example, the camera includes an imaging element such as a charge-coupled device (CCD) or a complementary MOS (CMOS). The camera is a camera that detects visible light or an infrared camera that detects infrared rays.

The radar is a millimeter-wave radar, a microwave radar, a laser radar or the like.

The LiDAR is an abbreviation for light detection and ranging, or laser imaging detection and ranging. The LiDAR is a sensor that generally emits invisible light forward and acquires information such as a distance to an object, a shape of the object and a material of the object based on the emitted light and returned light.

The lamp 7 is at least one of a headlamp or a position lamp provided at a front portion of the vehicle 1, a rear combination lamp provided at a rear portion of the vehicle 1, a turn signal lamp provided at the front portion or a lateral portion of the vehicle 1, and various lamps that inform a pedestrian and a driver of another vehicle of a situation of the own vehicle.

The HMI 8 includes an input unit that receives an input operation from the driver and an output unit that outputs traveling information or the like to the driver. The input unit includes a steering wheel, an accelerator pedal, a brake pedal, a driving mode switching switch for switching a driving mode of the vehicle 1, and the like. The output unit is a display that displays various types of traveling information.

The GPS 9 is configured to acquire current position information on the vehicle 1 and output the acquired current position information to the vehicle control unit 3. The wireless communication unit 10 is configured to receive traveling information on another vehicle around the vehicle 1 from another vehicle and transmit the traveling information on the vehicle 1 to another vehicle (inter-vehicle communication). The wireless communication unit 10 is configured to receive infrastructure information from an infrastructure facility such as a traffic light or a sign lamp and transmit the traveling information on the vehicle 1 to the infrastructure facility (road-to-vehicle communication). The map information storage unit 11 is an external storage device such as a hard disk drive in which map information is stored, and is configured to output the map information to the vehicle control unit 3.

When the vehicle 1 travels in the automatic driving mode, the vehicle control unit 3 automatically generates at least one of a steering control signal, an accelerator control signal and a brake control signal based on the traveling state information, the surrounding environment information, the current position information, the map information and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, the traveling of the vehicle 1 is automatically controlled by the vehicle system 2 in the automatic driving mode.

On the other hand, when the vehicle 1 travels in a manual driving mode, the vehicle control unit 3 generates a steering control signal, an accelerator control signal and a brake control signal according to a manual operation of the driver on the accelerator pedal, the brake pedal and the sleeting wheel. In this way, in the manual driving mode, since the steering control signal, the accelerator control signal and the brake control signal are generated by the manual operation of the driver, the traveling of the vehicle 1 is controlled by the driver.

Next, the driving mode of the vehicle 1 will be described. The driving mode includes the automatic driving mode and the manual driving mode. The automatic driving mode includes a fully automatic driving mode, an advanced driving support mode and a driving support mode. In the fully automatic driving mode, the vehicle system 2 automatically performs all types of traveling control including steering control, brake control and accelerator control, and the driver cannot drive the vehicle 1. In the advanced driving support mode, the vehicle system 2 automatically performs all types of traveling control including the steering control, the brake control and the accelerator control, and the driver can drive the vehicle 1 but does not drive the vehicle 1. In the driving support mode, the vehicle system 2 automatically performs a part of the traveling control including the steering control, the brake control and the accelerator control, and the driver drives the vehicle 1 under driving support of the vehicle system 2. In contrast, in the manual driving mode, the vehicle system 2 does not automatically perform the traveling control, and the driver drives the vehicle 1 without the driving support of the vehicle system 2.

The driving mode of the vehicle 1 may be switched by operating the driving mode switching switch. In this case, the vehicle control unit 3 switches the driving mode of the vehicle 1 among the four driving modes (the fully automatic driving mode, the advanced driving support mode, the driving support mode and the manual driving mode) according to an operation of the driver on the driving mode switching switch. The driving mode of the vehicle 1 may be automatically switched based on information on a travelable section where an automatic driving vehicle can travel or a traveling-prohibited section where an automatic driving vehicle is prohibited from traveling, or information on an external weather condition. In this case, the vehicle control unit 3 switches the driving mode of the vehicle 1 based on the information described above. The driving mode of the vehicle 1 may be automatically switched by using the seating sensor, the face orientation sensor or the like. In this case, the vehicle control unit 3 switches the driving mode of the vehicle 1 based on an output signal from the seating sensor or the face orientation sensor.

With reference back to FIG. 1, the vehicle 1 includes a front LiDAR 6f, a rear LiDAR 6b, a right LiDAR 6r, a left LiDAR 6l, a front camera 6c and a rear camera 6d as the external sensor 6. The front LiDAR 6f is configured to acquire information ahead of the vehicle 1. The rear LiDAR 6b is configured to acquire information behind the vehicle 1. The right LiDAR 6r is configured to acquire information on a right side of the vehicle 1. The left LiDAR 6l is configured to acquire information on a left side of the vehicle 1. The front camera 6c is configured to acquire information ahead of the vehicle 1. The rear camera 6d is configured to acquire information behind the vehicle 1.

In an example shown in FIG. 1, the front LiDAR 6f is provided at the front portion of the vehicle 1, the rear LiDAR 6b is provided at a rear portion of the vehicle 1, the right LiDAR 6r is provided at a right portion of the vehicle 1, and the left LiDAR 6l is provided at a left portion of the vehicle 1, but the present disclosure is not limited thereto. For example, the front LiDAR, the rear LiDAR, the right LiDAR, and the left LiDAR may be collectively disposed on a ceiling portion of the vehicle 1.

The vehicle 1 includes a right headlamp 7r and a left headlamp 7l as the lamp 7. The right headlamp 7r is provided at a right portion of the front portion of the vehicle 1, and the left headlamp 7l is provided at a left portion of the front portion of the vehicle 1. The right headlamp 7r is provided rightward than the left headlamp 7l.

The vehicle 1 includes a front window 1f and a rear window 1b.

The vehicle 1 includes a cleaner system 100 according to an embodiment of the present disclosure. The cleaner system 100 removes foreign matters such as water droplets, mud and dust that adhere to a cleaning target using a cleaning medium. In the present embodiment, the cleaner system 100 includes a front window washer (hereinafter referred to as a front WW) 101, a rear window washer (hereinafter referred to as a rear WW) 102, a front LiDAR cleaner (hereinafter referred to as a front LC) 103, a rear LiDAR cleaner (hereinafter referred to as a rear LC) 104, a right LiDAR cleaner (hereinafter referred to as a right LC) 105, a left LiDAR cleaner (hereinafter referred to as a left LC) 106, a right headlamp cleaner (hereinafter referred to as a right HC) 107, a left headlamp cleaner (hereinafter referred to as a left HC) 108, a front camera cleaner (hereinafter referred to as a front CC) 109a and a rear camera cleaner 109b (hereinafter referred to as a rear CC). Each of the cleaners (cleaner units) 101 to 109b has one or more nozzles, and discharges the cleaning medium such as a cleaning fluid or air from the nozzles toward the cleaning target.

The front WW 101 can clean the front window 1f. The rear WW 102 can clean the rear window 1b. The front LC 103 can clean the front LiDAR 6f. The rear LC 104 can clean the rear LiDAR 6b. The right LC 105 can clean the right LiDAR 6r. The left LC 106 can clean the left LiDAR 6l. The right HC 107 can clean the right headlamp 7r. The left HC 108 can clean the left headlamp 7l. The front CC 109a can clean the front camera 6c. The rear CC 109b can clean the rear camera 6d. In the following description, the front CC 109a and the rear CC 109b may be collectively referred to as a CC 109.

Figure 3:
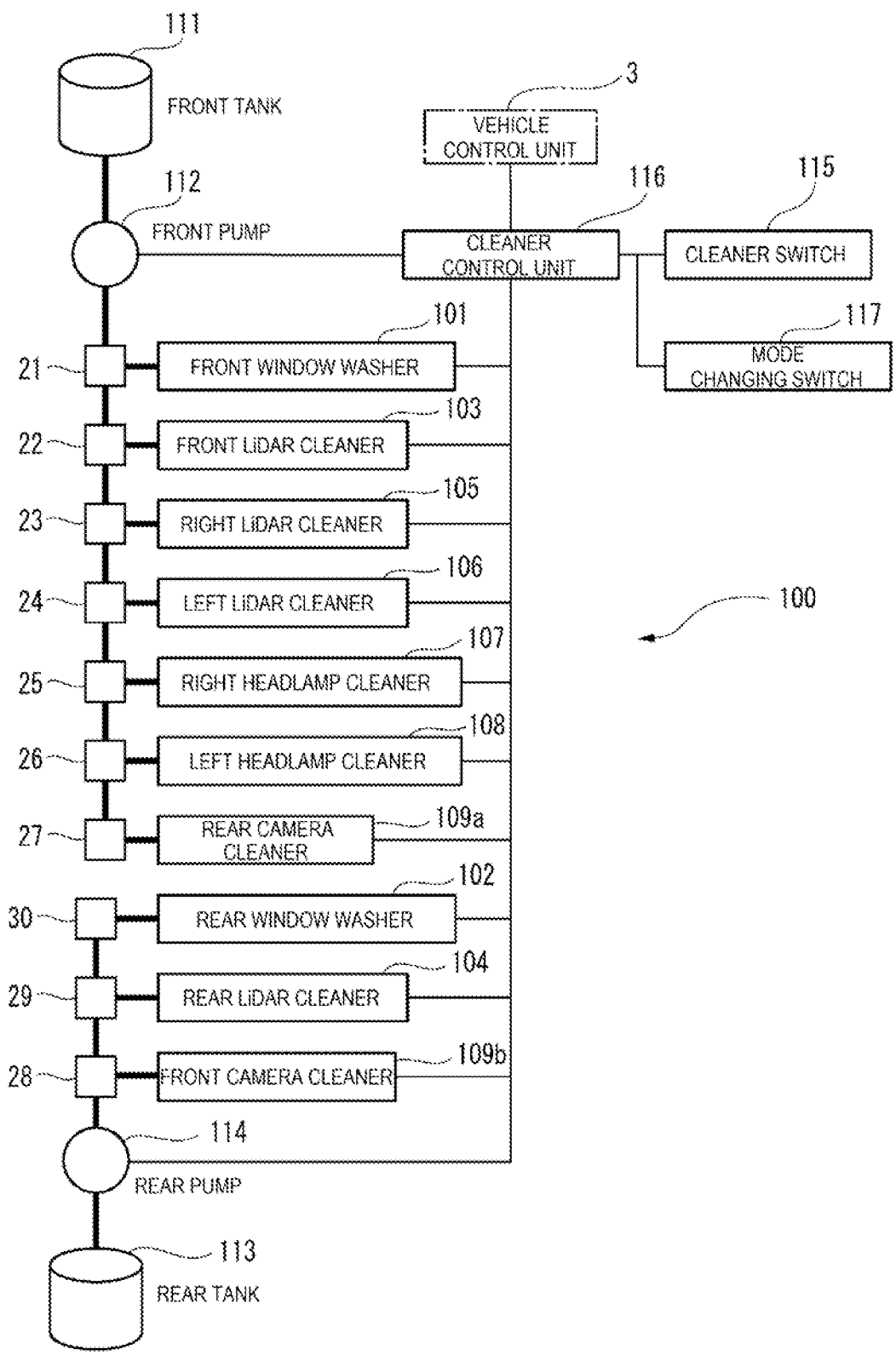
FIG. 3 is a block diagram of the cleaner system.

FIG. 3 is a block diagram of the cleaner system 100. The cleaner system 100 includes a front tank 111, a front pump 112, a rear tank 113, a rear pump 114 and a cleaner control unit 116 in addition to the cleaners 101 to 109b.

The front WW 101, the front LC 103, the right LC 105, the left LC 106, the right HC 107, the left HC 108 and the front CC 109a are connected to the front tank 111 via the front pump 112. The front pump 112 sends the cleaning fluid stored in the front tank 111 to the front WW 101, the front LC 103, the right LC 105, the left LC 106, the right HC 107, the left HC 108, and the front CC 109a.

The rear WW 102, the rear LC 104 and the rear CC 109b are connected to the rear tank 113 via the rear pump 114. The rear pump 114 sends the cleaning fluid stored in the rear tank 113 to the rear WW 102, the rear LC 104 and the rear CC 109b.

Each of the cleaners 101 to 109b is provided with an actuator that opens the nozzle to discharge the cleaning fluid to the cleaning target. The actuator provided in each of the cleaners 101 to 109b is electrically connected to the cleaner control unit 116. The cleaner control unit 116 is also electrically connected to the front pump 112, the rear pump 114 and the vehicle control unit 3.

In the cleaner system 100 according to the present embodiment, the cleaner control unit 116 is configured to output signals for operating the sensor cleaners 103 to 106, 109 to the sensor cleaners 103 to 106, 109 based on signals output from the vehicle control unit.

As shown in FIG. 3, in the cleaner system 100 according to the present embodiment, a first solenoid valve 21 is provided in a pipeline connecting the front pump 112 and the front WW 101, a second solenoid valve 22 is provided in a pipeline connecting the first solenoid valve 21 and the front LC 103, a third solenoid valve 23 is provided in a pipeline connecting the second solenoid valve 22 and the right LC 105, a fourth solenoid valve 24 is provided in a pipeline connecting the third solenoid valve 23 and the left LC 106, a fifth solenoid valve 25 is provided in a pipeline connecting the fourth solenoid valve 24 and the right HC 107, a sixth solenoid valve 26 is provided in a pipeline connecting the fifth solenoid valve 25 and the left HC 108, and a seventh solenoid valve 27 is provided in a pipeline connecting the sixth solenoid valve 26 and the front CC 109a.

An eighth solenoid valve 28 is provided in a pipeline connecting the rear pump 114 and the rear CC 109b, a ninth solenoid valve 29 is provided in a pipeline connecting the eighth solenoid valve 28 and the rear LC 104, and a tenth solenoid valve 30 is provided in a pipeline connecting the ninth solenoid valve 29 and the rear WW 102.

Figure 4:
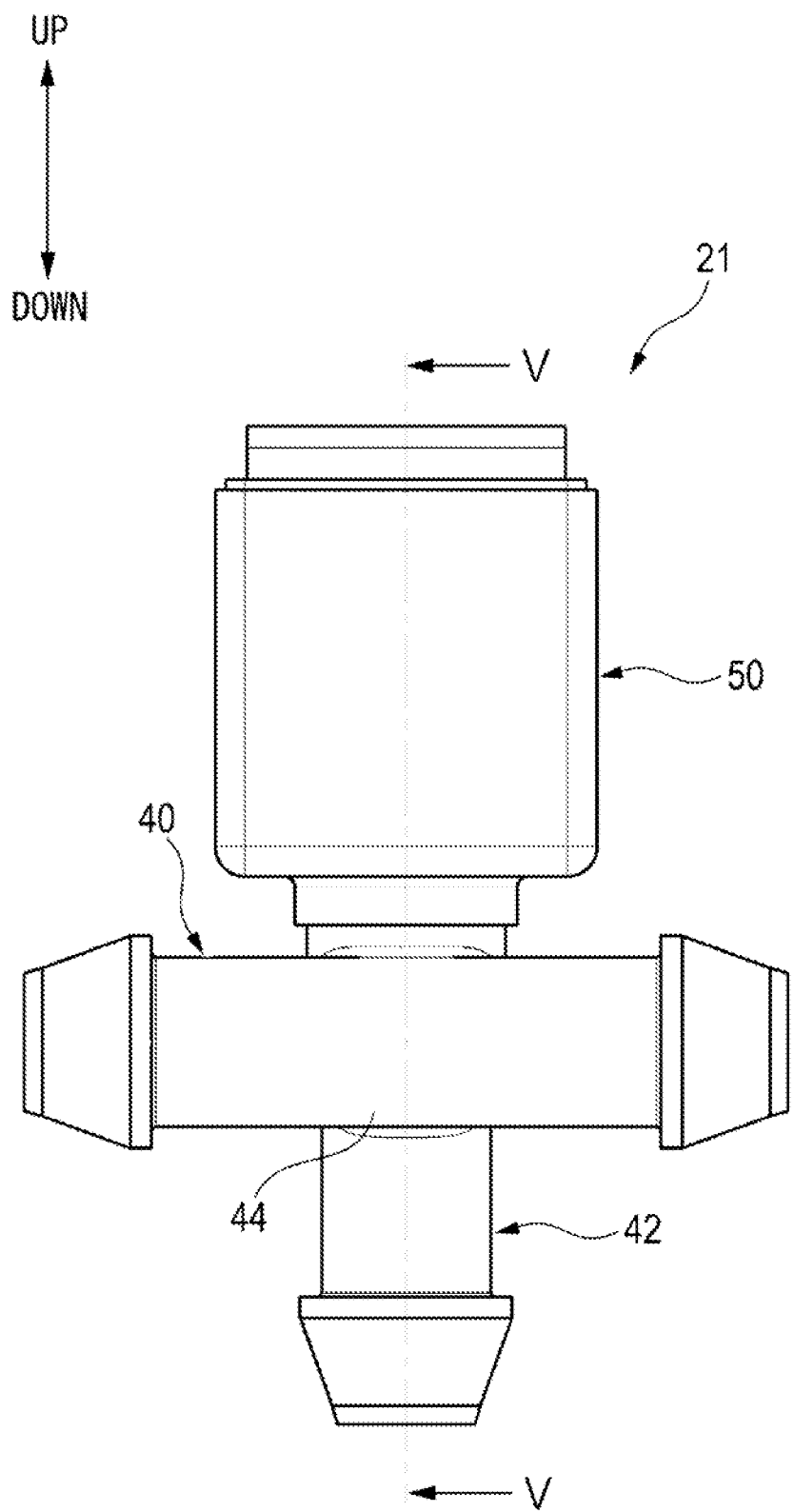
FIG. 4 is a front view of a first solenoid valve.
Figure 5:
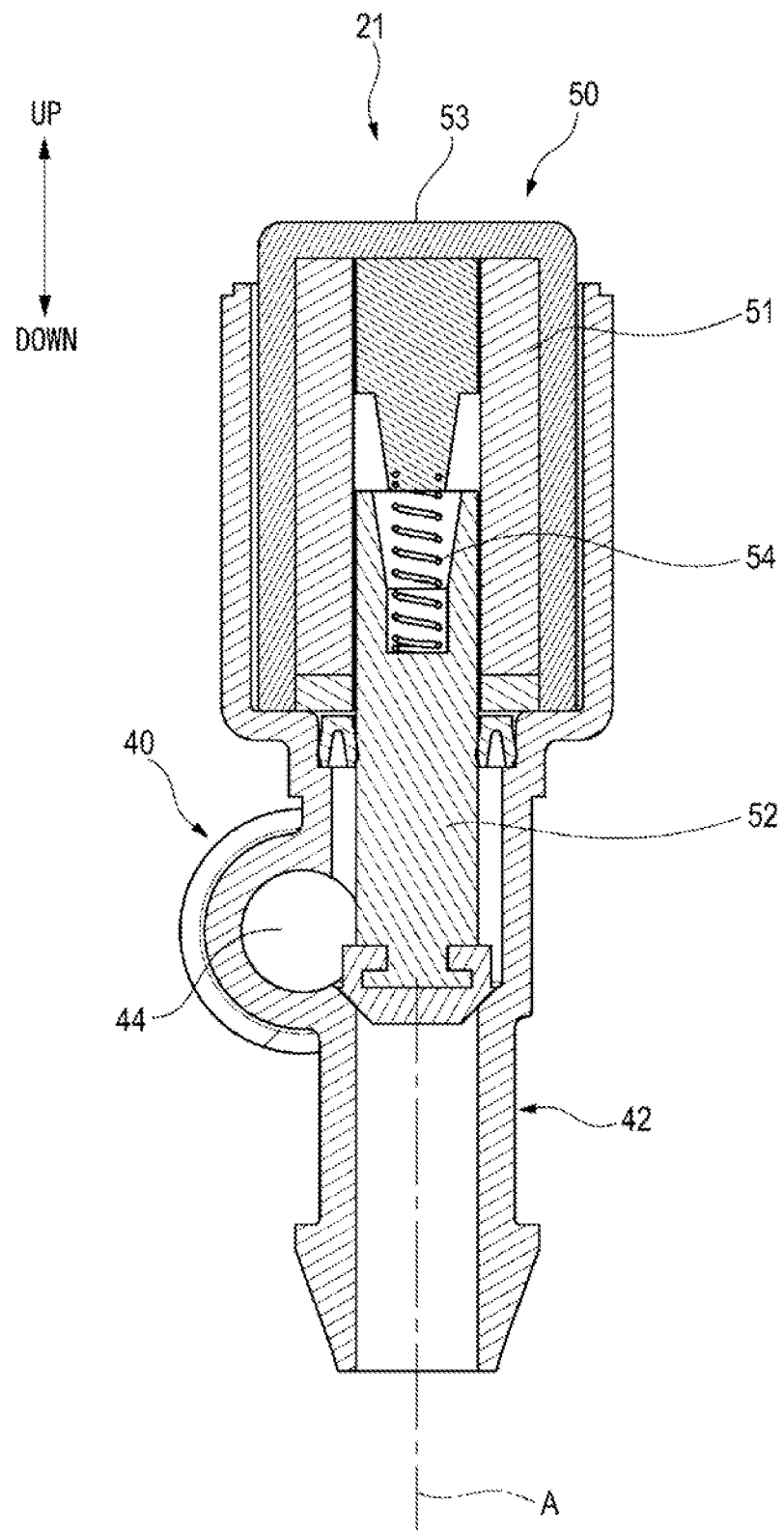
FIG. 5 is a cross-sectional view taken along a line V-V in FIG. 4 in a closed state.

The first solenoid valve 21 to the tenth solenoid valve 30 all have the same configuration. The first solenoid valve 21 will be described with reference to FIGS. 4 and 5. FIG. 4 is a front view of the first solenoid valve 21. FIG. 5 is a cross-sectional view taken along a line V-V in FIG. 4 in a closed state.

As shown in FIGS. 4 and 5, the first solenoid valve 21 includes a first pipeline 40, a second pipeline 42, an intersection portion 44 and a solenoid 50. The first pipeline 40 is connected to the front pump 112. The second pipeline 42 is connected to the front WW 101. The intersection portion (merging portion) 44 is a portion where the first pipeline 40 and the second pipeline 42 intersect with each other. The cleaning fluid that has been discharged from the front pump 112 and flowed in from the first pipeline 40 flows into the second pipeline 42 via the intersection portion 44.

The solenoid 50 includes a coil 51 (stator), a mover 52, a yoke 53 and a spring 54. The spring 54 is provided between the yoke 53 and the mover 52. The mover 52 is linearly displaceable along an axis A.

In a normal state in which the coil 51 is not energized, the first solenoid valve 21 is in the closed state shown in FIG. 5. In this closed state, the spring 54 urges the mover 52 downward, so that the intersection portion 44 between the first pipeline 40 and the second pipeline 42 is closed by the mover 52. Therefore, the cleaning fluid does not flow from the first pipeline 40 to the second pipeline 42. That is, the first solenoid valve 21 is a normally closed type solenoid valve.

On the other hand, when the coil 51 is energized, a force that tends to approach the coil 51 (a force upward in FIG. 5) is generated in the mover 52. The mover 52 moves upward in FIG. 5 while compressing the spring 54 against an elastic force of the spring 54. Thereby, the intersection portion 44 is opened, and the cleaning fluid flows from the first pipeline 40 to the second pipeline 42.

In this way, the first solenoid valve 21 is switchable between the closed state in which the cleaning fluid that has been discharged from the front pump 112 and flowed into the first solenoid valve 21 is not allowed to be sent to the front WW 101 and an open state in which the cleaning fluid that has been discharged from the front pump 112 and flowed into the first solenoid valve 21 is allowed to be sent to the front WW 101. That is, the first solenoid valve 21 is switchable between permission and non-permission of movement of the cleaning fluid from the front pump 112 to the front WW 101.

First Embodiment

Figure 6:
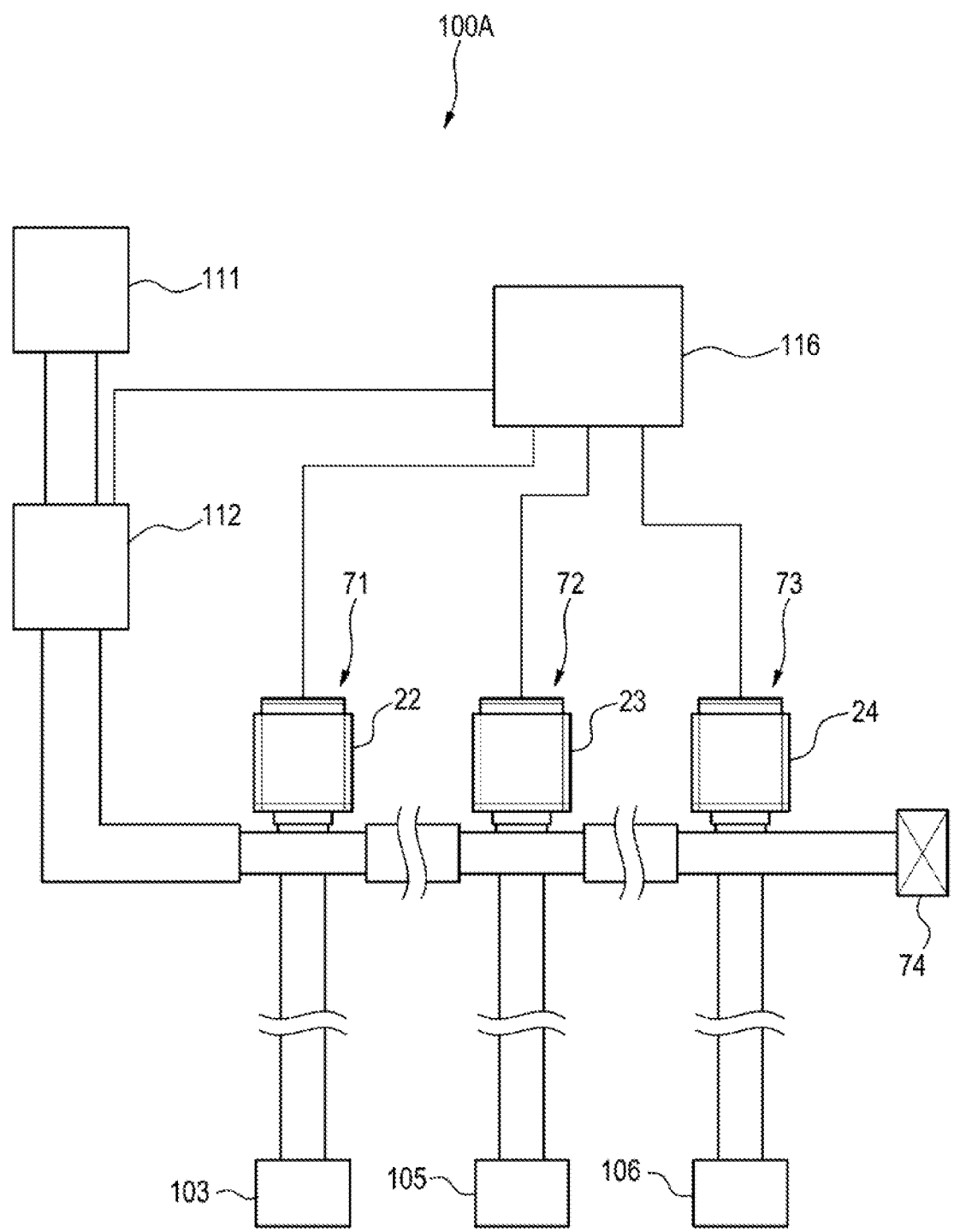
FIG. 6 is a schematic view showing a stale in which solenoid valves are connected between a front pump and a plurality of cleaners.
Figure 7:
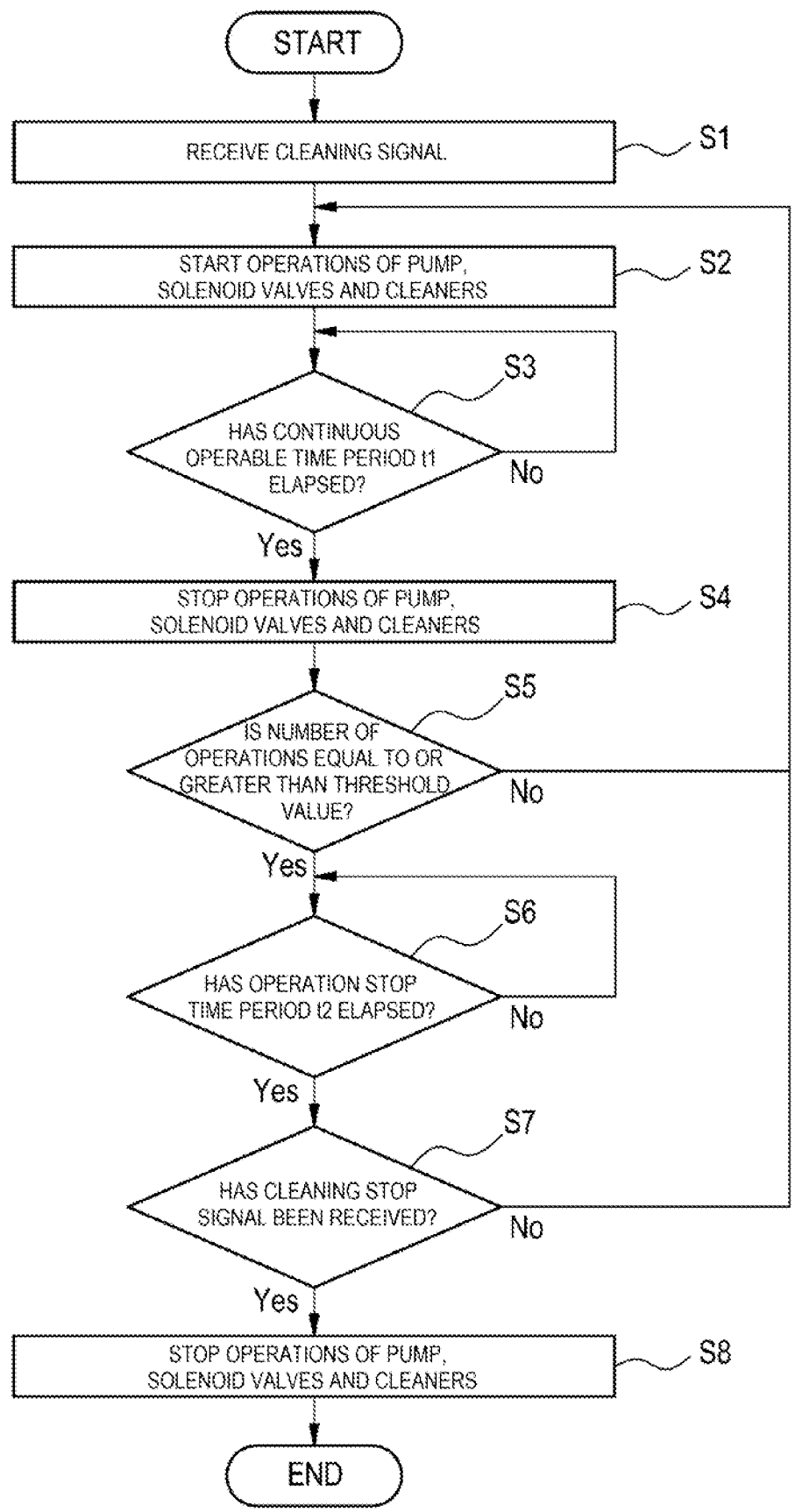
FIG. 7 is a flowchart showing an example of processing executed by a cleaner control unit according to a first embodiment.
Figure 8:
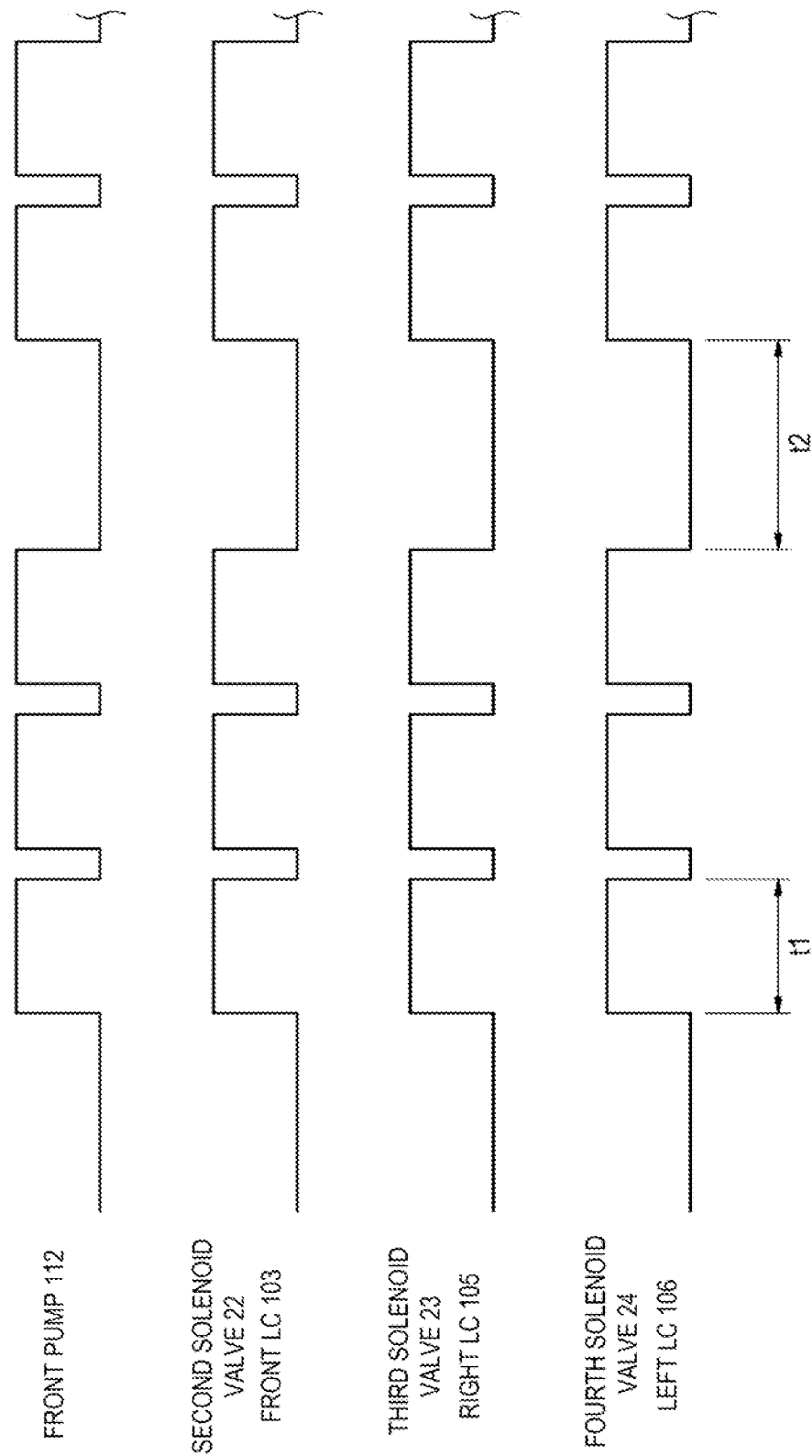
FIG. 8 is a timing chart schematically showing an operation timing of the front pump and operation timings of each solenoid valve and each cleaner in the first embodiment.

A first embodiment of the present disclosure will be described with reference to FIGS. 6 to 8. FIG. 6 is a schematic view showing a stale in which the second solenoid valve 22 to the fourth solenoid valve 24 are connected between the front pump 112 and a plurality of cleaners (for example, the front LC 103, the right LC 105 and the left LC 106) in a cleaner system 100A according to the first embodiment. FIG. 7 is a flowchart showing an example of processing executed by the cleaner control unit 116 in the cleaner system 100A shown in FIG. 6. FIG. 8 is a timing chart schematically showing an operation timing of the front pump 112, an operation timing of the second solenoid valve 22 and the front LC 103, an operation timing of the third solenoid valve 23 and the right LC 105, and an operation timing of the fourth solenoid valve 24 and the left LC 106.

As shown in FIG. 6, the cleaner system 100A according to the first embodiment includes, for example, the front tank 111 that stores a cleaning fluid, and the front pump 112 that sends the cleaning fluid stored in the front tank 111 to the front LC 103, the right LC 105, the left LC 106 and the like, in order to simplify description, cleaners (the front WW 101, the right HC 107 and the like) shown in FIG. 3 other than the front LC 103, the right LC 105 and the left LC 106 are not shown.

A branch portion 71 including the second solenoid valve 22 having the above-described structure, a branch portion 72 including the third solenoid valve 23 having the above-described structure, and a branch portion 73 including the fourth solenoid valve 24 having the above-described structure are provided on a downstream side of the front pump 112. A closing portion 74 that prevents discharge of the cleaning fluid to outside is provided on an outlet side (a downstream side) of the first pipeline 40 of the fourth solenoid valve 24.

Operations of the front pump 112, the front LC 103, the right LC 105, the left LC 106, the second solenoid valve 22, the third solenoid valve 23 and the fourth solenoid valve 24 are controlled by the cleaner control unit 116. The cleaner control unit 116 can switch between permission and non-permission of the discharge of the cleaning fluid to the front LC 103 by switching the second solenoid valve 22 between an open state and a closed suite. The cleaner control unit 116 can switch between permission and non-permission of the discharge of the cleaning fluid to the right LC 105 by switching the third solenoid valve 23 between an open suite and a closed suite. The cleaner control unit 116 can switch between permission and non-permission of the discharge of the cleaning fluid to the left LC 106 by switching the fourth solenoid valve 24 between an open state and a closed state.

Next, the example of the processing executed by the cleaner control unit 116 in the cleaner system 100A shown in FIG. 6 will be described with reference to FIGS. 7 and 8.

As shown in FIG. 7, first, the cleaner control unit 116 receives a cleaning signal for cleaning a cleaning target mounted on the vehicle 1 from the vehicle control unit 3 (step S1). In the present embodiment, for example, the cleaner control unit 116 receives, from the vehicle control unit 3, a cleaning signal for cleaning each of the front LiDAR 6f serving as a cleaning target of the front LC 103, the right LiDAR 6r serving as a cleaning target of the right LC 105, and the left LiDAR 6l serving as a cleaning target of the left LC 106.

Next, as shown in FIG. 8, the cleaner control unit 116 starts the operation of the front pump 112 based on the cleaning signal received from the vehicle control unit 3 (step S2). That is, the cleaner control unit 116 starts the discharge of the cleaning fluid from the front pump 112. The cleaner control unit 116 starts the operations of the front LC 103, the right LC 105 and the left LC 106, which are the cleaners for respectively cleaning the front LiDAR 6f, the right LiDAR 6r and the left LiDAR 6l, substantially simultaneously with a start of the operation of the front pump 112. The cleaner control unit 116 starts the operations of the second solenoid valve 22, the third solenoid valve 23 and the fourth solenoid valve 24 for respectively supplying the cleaning fluid to the front LC 103, the right LC 105 and the left LC 106, substantially simultaneously with the start of the operation of the front pump 112.

Next, the cleaner control unit 116 determines whether a continuous operable time period t1 has elapsed (step S3). The continuous operable time period t1 is a time period during which the front pump 112 and the solenoid valves 22 to 24 can be continuously operated (see FIG. 8). That is, the continuous operable time period t1 corresponds to a continuous supply time period of the cleaning fluid by the front pump 112 or a continuous permission time period of movement of the cleaning fluid by the second solenoid valve 22 to the fourth solenoid valve 24. The continuous operable time period t1 may be freely set as long as the front pump 112 and the solenoid valves 22 to 24 do not overheat. In this example, a continuous operable time period of each of the second solenoid valve 22 to the fourth solenoid valve 24 respectively corresponding to the front LC 103, the right LC 105 and the left LC 106, as well as the cleaners 103, 105, 106, is set to be substantially the same as a continuous operable time period of the front pump 112. The continuous operable time period of the front pump 112 and the continuous operable time period of each of the solenoid valves 22 to 24 may be different from each other.

In step S3, when the continuous operable time period t1 is determined to have elapsed (Yes in step S3), the cleaner control unit 116 stops the operations of the front pump 112, the front LC 103, the right LC 105, the left LC 106, and the second solenoid valve 22 to the fourth solenoid valve 24 (step S4).

Next, the cleaner control unit 116 determines whether the number of operations of the front pump 112 and the like based on one cleaning signal received from the vehicle control unit 3 is equal to or greater than a threshold value (a predetermined number of times) (step S5). The threshold value of the number of operations is, for example, one to ten. In this example, the threshold value is assumed to be three.

When the number of operations of the front pump 112 and the like is determined to be smaller than three in step S5 (No in step S5), the processing returns to step S2, and the cleaner control unit 116 resumes the operations of the front pump 112, the LCs 103, 105, 106 and the solenoid valves 22 to 24.

On the other hand, when the number of operations of the front pump 112 and the like is determined to be three or more (Yes in step S5), the cleaner control unit 116 determines whether an operation stop time period t2 has elapsed (step S6). The operation stop time period t2 is a time period from when the operations of the front pump 112, the LC's 103, 105, 106 and the solenoid valves 22 to 24 are stopped to when the operations of the front pump 112, the LCs 103, 105, 106 and the solenoid valves 22 to 24 are resumed (see FIG. 8). The operation stop time period t2 is preferably set to be longer than the continuous operable time period t1 of the front pump 112 and the like, that is, the continuous supply time period of the cleaning fluid by the front pump 112 or the continuous permission time period of the movement of the cleaning fluid by the second solenoid valve 22 to the fourth solenoid valve 24.

When the operation stop time period t2 is determined to have elapsed in step S6 (Yes in step S6), the cleaner control unit 116 determines whether a cleaning stop signal has been received from the vehicle control unit 3 (step S7).

When the cleaning stop signal is determined to have not been received in step S7 (No in step S7), the processing returns to step S2 and the cleaner control unit 116 resumes the operations of the front pump 112, the LCs 103, 105, 106 and the solenoid valves 22 to 24.

On the other hand, when the cleaning stop signal is determined to have been received (Yes in step S7), the cleaner control unit 116 stops the operations of the front pump 112, the LC's 103, 105, 106 and the solenoid valves 22 to 24, and ends the processing (step S8).

As described above, the cleaner system 100A according to the first embodiment includes the front LC 103, the right LC 105 and the left LC 106 (examples of cleaner units), the front pump 112 that supplies the cleaning fluid to the cleaners 103, 105, 106 (an example of a motor pump), the normally closed type second solenoid valve 22 to the fourth solenoid valve 24 that respectively switch permission and non-permission of the movement of the cleaning fluid from the front pump 112 to the cleaners 103, 105, 106, and the cleaner control unit 116 that controls the front pump 112, the cleaners 103, 105, 106 and the solenoid valves 22 to 24. The cleaner control unit 116 sets the operation stop time period t2 for stopping the operations of the front pump 112, the cleaners 103, 105, 106 and the solenoid valves 22 to 24, causes the LiDARs 6f, 6r, 6l corresponding to the cleaners 103, 105, 106 to discharge the cleaning fluid, and then stops the operations of the front pump 112, the cleaners 103, 105, 106 and the solenoid valves 22 to 24 during the operation stop time period t2 based on a predetermined condition. In this way, by providing the operation stop time period t2 for stopping the discharge of the cleaning fluid after the front pump 112 and the solenoid valves 22 to 24 are operated and the cleaning fluid is discharged to the LiDARs 6f, 6r, 6l, heat dissipation properties of the front pump 112 and the solenoid valves 22 to 24 can be improved, and deterioration of the front pump 112 and the solenoid valves 22 to 24 due to overheating can be prevented. In addition, by providing the operation stop time period t2, the cleaner control unit 116 can prevent infinite continuation of the discharge of the cleaning fluid to the cleaning targets. Such infinite continuation might be occurred by determining that the cleaning fluid remains in each of the LiDARs 6f, 6r, and 6l serving as the cleaning targets as dirt.

The cleaner control unit 116 according to the present embodiment preferably sets the operation stop time period t2 to be longer than the continuous operable time period t1. Thereby, overheating of the front pump 112 or the solenoid valves 22 to 24 can be more reliably prevented.

When the number of operations of the front pump 112 and the solenoid valves 22 to 24 is equal to or greater than a predetermined number of times, the cleaner control unit 116 stops the operations of the front pump 112 and the solenoid valves 22 to 24 during the operation stop time period t2. Thereby, the front pump 112 and the solenoid valves 22 to 24 can be continuously operated to such an extent that the front pump 112 and the solenoid valves 22 to 24 do not overheat. The threshold value of the number of operations may be set to one, and the operation stop time period t2 may be provided every time one operation of the front pump 112 and the solenoid valves 22 to 24 is completed. Thereby, overheating of the front pump 112 or the solenoid valves 22 to 24 can be more reliably prevented.

Modification of First Embodiment

Figure 9:
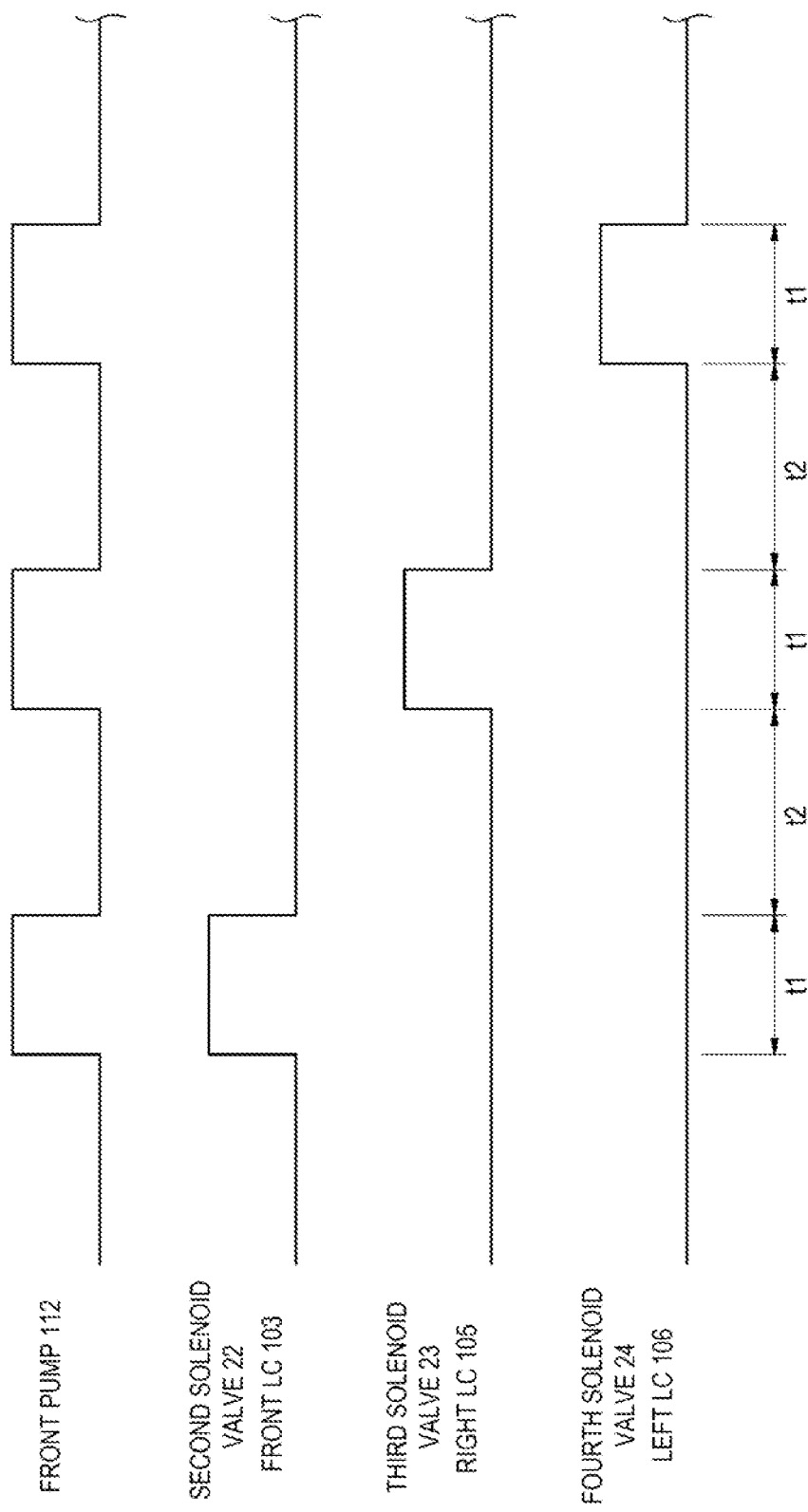
FIG. 9 is a timing chart according to a modification of the first embodiment.

Next, a modification of the first embodiment will be described with reference to FIG. 9. FIG. 9 is a timing chart according to the modification of the first embodiment.

As shown in FIG. 9, in the present modification, the cleaner control unit 116 may sequentially operate the solenoid valves 22 to 24 in conjunction with the operation of the front pump 112 such that operation timings of the solenoid valves 22 to 24 do not overlap.

Specifically, the cleaner control unit 116 operates the second solenoid valve 22 (and the front LC 103) for the continuous operable time period t1 in synchronization with the first operation of the front pump 112. At this time, the cleaner control unit 116 stops the operations of the third solenoid valve 23 (and the right LC 105) and the fourth solenoid valve 24 (and the left LC 106). When the continuous operable tune period t1 of the front pump 112 and the second solenoid valve 22 elapses, the cleaner control unit 116 stops the operations of the front pump 112 and the solenoid valves 22 to 24 during the operation stop time period t2.

Next, the cleaner control unit 116 operates the third solenoid valve 23 (and the right LC 105) for the continuous operable time period t1 in synchronization with the second operation of the front pump 112. At this time, the cleaner control unit 116 stops the operations of the second solenoid valve 22 (and the front LC 103) and the fourth solenoid valve 24 (and the left LC 106). When the continuous operable time period t1 of the front pump 112 and the third solenoid valve 23 elapses, the cleaner control unit 116 stops the operations of the front pump 112 and the solenoid valves 22 to 24 during the operation slop time period t2.

Next, the cleaner control unit 116 operates the fourth solenoid valve 24 (and the left LC 106) for the continuous operable time period t1 in synchronization with the third operation of the front pump 112. At this time, the cleaver control unit 116 stops the operations of the second solenoid valve 22 (and the front LC 103) and the third solenoid valve 23 (and the right LC 105). When the continuous operable time period t1 of the front pump 112 and the fourth solenoid valve 24 elapses, the cleaner control unit 116 stops the operations of the front pump 112 and the solenoid valves 22 to 24 during the operation stop time period t2.

For example, when a time period during which the operations of the solenoid valves 22 to 24 are to be stopped is longer than a time period during which the operation of the front pump 112 is to be stopped, it is necessary to stop the operation of the front pump 112 according to the operation stop time period of the solenoid valves 22 to 24 in a configuration of the first embodiment. In such a case, as described in the present modification, by sequentially operating the solenoid valves 22 to 24 such that the operation timings of the solenoid valves 22 to 24 do not overlap, waste of operation standby time of the front pump 112 due to the operation stop time period of the solenoid valves 22 to can be prevented.

When the cleaning fluid is simultaneously supplied from the front pump 112 to the plurality of cleaner units (the front LC 103, the right LC 105 and the left LC 106 in this example), a water pressure of the cleaning fluid may decrease, which may lead to a decrease in cleaning performance. According to the present modification, since the cleaning fluid is not simultaneously supplied to the plurality of cleaners, the cleaning performance of the cleaner system can be maintained.

Second Embodiment

Next, a cleaner system according to a second embodiment will be described with reference to FIGS. 10 and 11.

Figure 10:
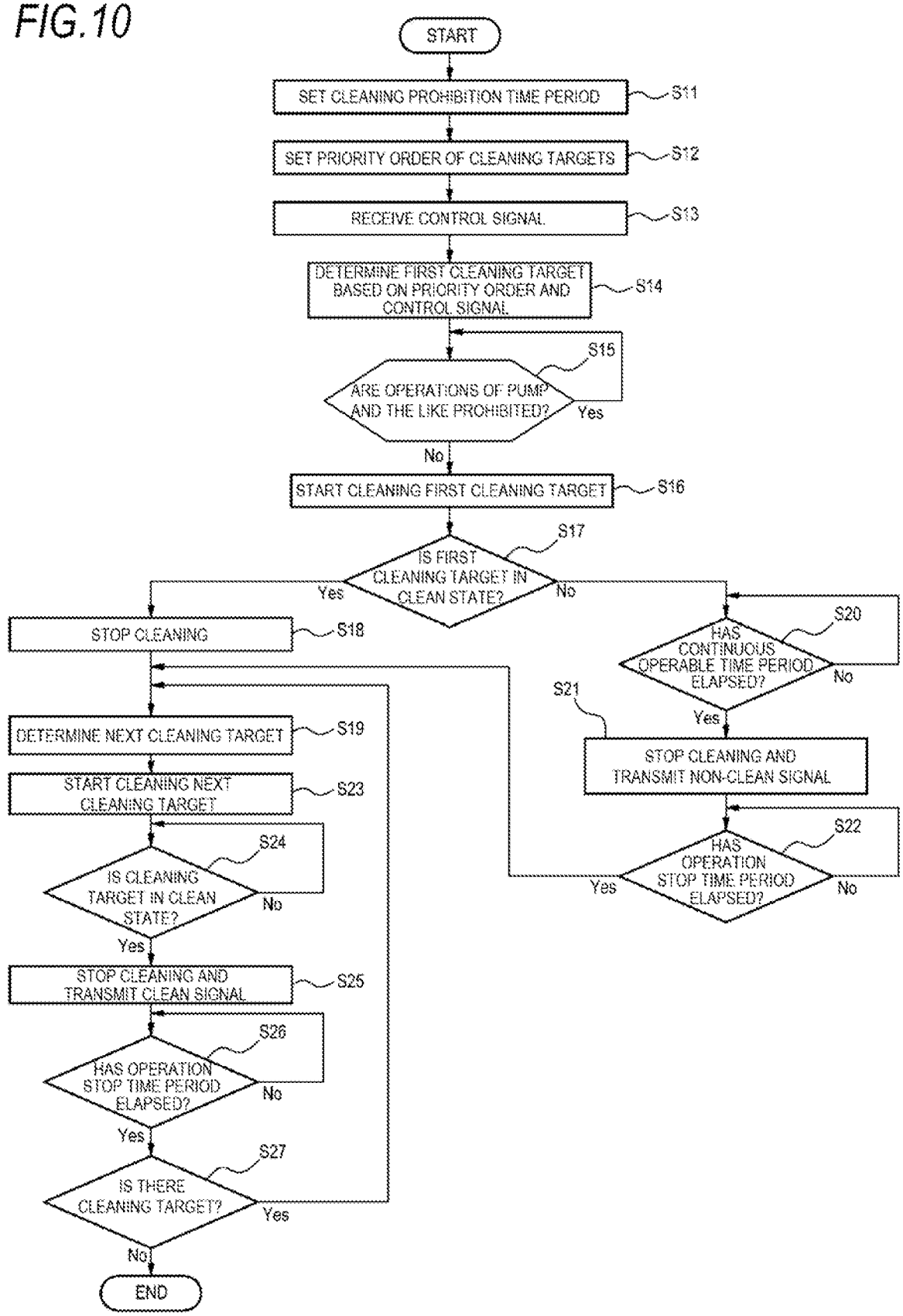
FIG. 10 is a flowchart showing an example of processing executed by a cleaner control unit according to a second embodiment.
Figure 11:
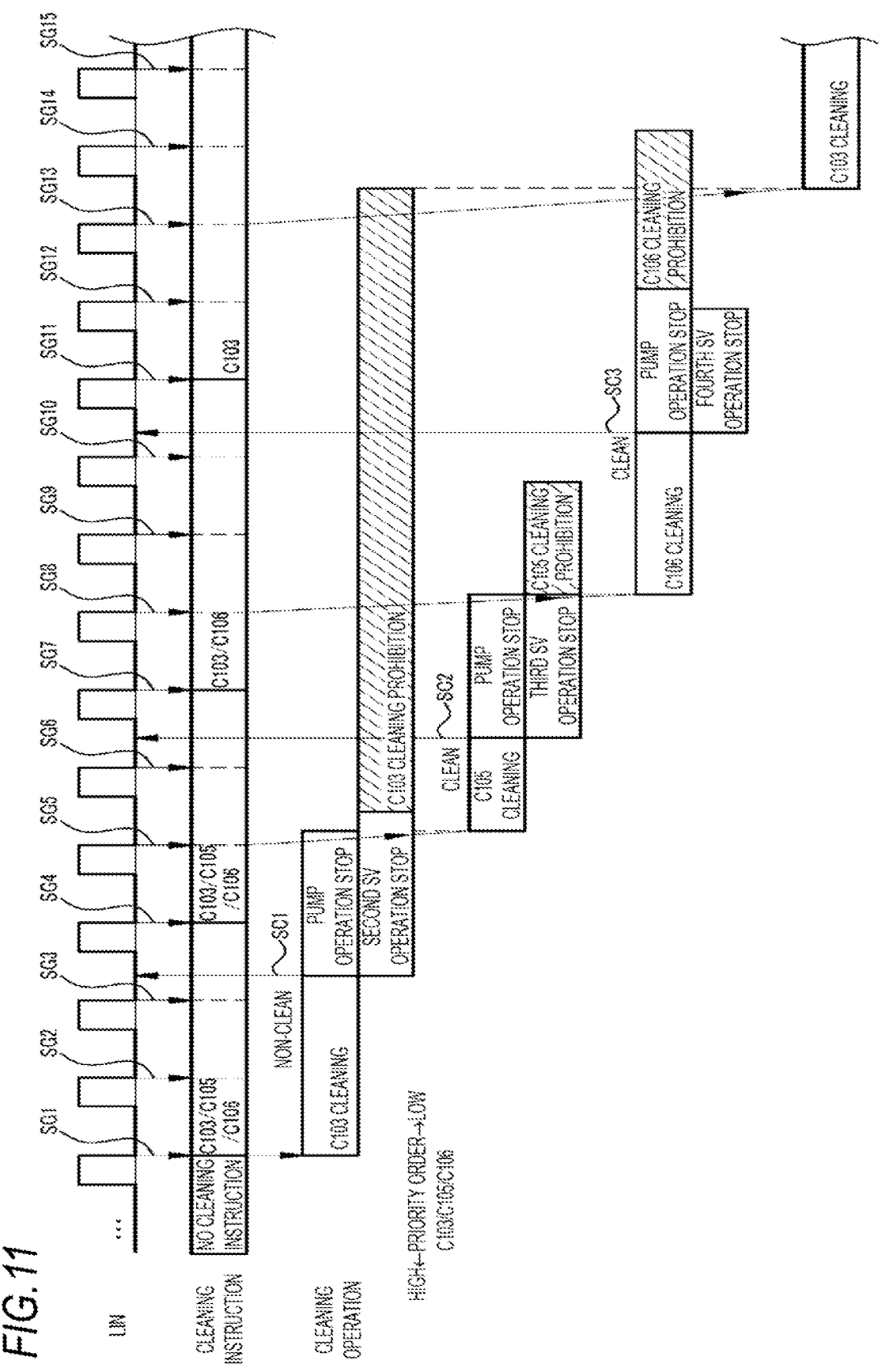
FIG. 11 is a timing chart schematically showing an operation timing of each cleaner unit in the second embodiment.

FIG. 10 is a flowchart showing an example of processing executed by the cleaner control unit 116 according to the second embodiment. FIG. 11 is a timing chart schematically showing operation timings of the cleaners 103, 105, 106 in the second embodiment. In FIG. 11, the front LC 103 is denoted as "C103", the right LC 105 is denoted as "C105", and the left LC 106 is denoted as "C106".

In the second embodiment, the vehicle control unit 3 and the cleaner control unit 116 are connected by local interconnect network (LIN) communication via a signal line. The LIN communication is a type of in-vehicle local area network (LAN) communication protocol. In the LIN communication, a time trigger system is adopted, and a control signal is transmuted from the vehicle control unit 3 to the cleaner control unit 116 at a predetermined cycle as shown in FIG. 11.

First, as shown in FIG. 10, the cleaner control unit 116 sets a cleaning prohibition time period for slopping cleaning of each cleaner unit (step S11). The cleaning prohibition time period is provided to maintain a function of the external sensor 6 (a camera or a LiDAR) to be cleaned by each cleaner unit. If the cleaning of the external sensor 6 by the cleaner unit is continued for a long time, a sensing function and the like of the external sensor 6 may be inhibited. Therefore, it is necessary to provide the cleaning prohibition time period such that the cleaning does not continue for a long time. In this example, the cleaner control unit 116 sets the cleaning prohibition time period for each of the front LC 103 that cleans the front LiDAR 6f, the right LC 105 that cleans the right LiDAR 6r, and the left LC 106 that cleans the left LiDAR 6l. The cleaning prohibition time period may be the same or different among the front LC 103, the right LC 105 and the left LC 106. For example, in this example, as shown as a hatched portion in FIG. 11, the cleaning prohibition time period of the front LC 103 is set to be the longest, and the cleaning prohibition time period of the right LC 105 is set to be the shortest.

Next, the cleaner control unit 116 sets a priority order of cleaning targets (step S12). The priority order of the cleaning of the cleaning targets is stored in the cleaner control unit 116 as, for example, a priority order table. In this example, the cleaner control unit 116 sets the priority order of the cleaning of the front LiDAR 6f, the right LiDAR 6r and the left LiDAR 6l. The priority order of the cleaning is, for example, in an order of the front LiDAR 6f, the right LiDAR 6r and the left LiDAR 6l.

Next, the cleaner control unit 116 receives a control signal SG1 from the vehicle control unit 3 (step S13). The control signal SG1 includes a cleaning signal for cleaning a cleaning target mounted on a vehicle. In this example, the cleaner control unit 116 receives, for example, a cleaning signal for cleaning each of the front LiDAR 6f, the right LiDAR 6r and the left LiDAR 6l as the control signal SG1 from the vehicle control unit 3.

Next, the cleaner control unit 116 determines a first cleaning target based on the priority order set in step S12 and the control signal SG1 received in step S13 (step S14). In this example, the cleaner control unit 116 determines the front LiDAR 6f having the highest priority in the priority order table as the first cleaning target among the front LiDAR 6f, the right LiDAR 6r and the left LiDAR 6l included in the control signal SG1.

Next, the cleaner control unit 116 determines whether operations of the front pump 112 and the solenoid valves 22 to 24 are prohibited (step S15). In step S15, when the operations of the front pump 112 and the solenoid valves 22 to 24 are determined to be prohibited (Yes in step S15), the cleaner control unit 116 waits until prohibition of the operations of the front pump 112 and the solenoid valves 22 to 24 is released.

On the other hand, when the operations of the front pump 112 and the solenoid valves 22 to 24 are not prohibited (No in step S15), the cleaner control unit 116 starts cleaning the first cleaning target (step S16). In this example, as shown in FIG. 11, the cleaner control unit 116 starts the operation of the front LC 103 in order to clean the front LiDAR 6f determined as the first cleaning target in step S14. The cleaner control unit 116 starts discharge of a cleaning fluid from the front pump 112 and opens the second solenoid valve 22 in conjunction with the operation of the front LC 103.

Next, the cleaner control unit 116 determines whether the first cleaning target is in a clean slate (step S17). In this example, the cleaner control unit 116 determines whether the front LiDAR 6f cleaned by the front LC 103 is in a clean state. Whether the front LiDAR 6f is in the clean state may be sensed by, for example, a contamination sensor (not shown) attached to the front LiDAR 6f, or may be sensed based on a state of an image acquired by the front LiDAR 6f.

In step S17, when the first cleaning target is determined to be in the clean state (Yes in step S17), the cleaner control unit 116 stops cleaning the first cleaning target (step S18). Next, the cleaner control unit 116 determines a next cleaning target based on the priority order table (step S19).

On the other hand, when the first cleaning target is determined not to be in the clean state (No in step S17), the cleaner control unit 116 determines whether a continuous operable time period of the front pump 112 and the second solenoid valve 22 (for example, the continuous operable time period t1 shown in FIG. 9) has elapsed (step S20). In this example, as shown in FIG. 11, it is assumed that the front LiDAR 6f is determined not to be in the clean state (non-clean). In this case, the cleaner control unit 116 determines whether the continuous operable time period of the front pump 112 and/or the second solenoid valve 22 has elapsed.

In step S20, when the continuous operable time period is determined to have not elapsed (No in step S20), the cleaner control unit 116 continues cleaning the first cleaning target. In this example, when the continuous operable time period is determined to have not elapsed, the cleaner control unit 116 continues cleaning the front LiDAR 6f by the front LC 103. A control signal SG2 and a control signal SG3 received from the vehicle control unit 3 during the continuous operable time period of the front pump 112 and/or the second solenoid valve 22 also continuously include information on the front LiDAR 6f, the right LiDAR 6r and the left LiDAR 6l as the cleaning targets (see FIG. 11).

On the other hand, when the continuous operable time period is determined to have elapsed (Yes in step S20), the cleaner control unit 116 stops cleaning the first cleaning target and transmits a non-clean signal indicating that the cleaning target is not in the clean state to the vehicle control unit 3 (step S21). In this example, when the continuous operable time period is determined to have elapsed, as shown in FIG. 11, the cleaner control unit 116 stops cleaning the front LiDAR 6f, that is, stops the operations of the front pump 112, the front LC 103 and the second solenoid valve 22, and transmits a non-clean signal SC1 indicating that the front LiDAR 6f is not in the clean state to the vehicle control unit 3.

Next, the cleaner control unit 116 determines whether an operation stop time period of the front pump 112 has elapsed (step S22). In order to prevent overheating of the front pump 112, the operation stop time period for stopping the operation of the front pump 112 for a certain time period is provided when the continuous operable time period has elapsed.

In step S22, when the operation stop time period of the front pump 112 is determined to have not elapsed (No in step S22), the cleaner control unit 116 continues to stop the operation of the front pump 112. The operation stop time period of the front pump 112 may be different from an operation stop time period of the solenoid valves 22 to 24. In this example, as shown in FIG. 11, the operation stop time period of the second solenoid valve (second SV) 22 is set to be longer than the operation stop time period of the front pump 112.

On the other hand, when the operation stop time period of the front pump 112 is determined to have elapsed (Yes in step S22), the cleaner control unit 116 determines the next cleaning target, that is, a second cleaning target, based on a control signal SG6 received from the vehicle control unit 3 (step S19). In this example, in step S21, the non-clean signal SC1 indicating that the front LiDAR 6f is not in the clean state is transmitted to the vehicle control unit 3. Therefore, control signals SG4 to SG6 received from the vehicle control unit 3 after the non-clean signal SC1 is transmitted to the vehicle control unit 3 still include information on the front LiDAR 6f that requires further cleaning as well as the right LiDAR 6r and the left LiDAR 6l that have not been cleaned. However, as shown in FIG. 11, when the operation stop time period of the front pump 112 has elapsed, the operation stop time period of the second solenoid valve 22 for supplying the cleaning fluid to the front LC 103 has not elapsed. Therefore, in this example, the cleaner control unit 116 does not determine the front LiDAR 6f having the highest priority as the second cleaning target, but determines the right LiDAR 6r having the next highest priority after the front LiDAR 6f as the second cleaning target.

Next, the cleaner control unit 116 starts cleaning the second cleaning target determined in step S19 (step S23). In this example, the cleaner control unit 116 starts cleaning the right LiDAR 6r determined as the second cleaning target according to the control signal SG5. That is, the cleaner control unit 116 starts the operation of the right LC 105 corresponding to the right LiDAR 6r. The cleaner control unit 116 starts the discharge of the cleaning fluid from the front pump 112 and opens the third solenoid valve 23 in conjunction with the operation of the right LC 105.

Next, the cleaner control unit 116 determines whether the cleaning target being cleaned is in a clean state (step S24). In this example, the cleaner control unit 116 determines whether the right LiDAR 6r cleaned by the right LC 105 is in a clean state.

In step S24, when the cleaning target being cleaned is determined to be in the clean state (Yes in step S24), the cleaner control unit 116 stops cleaning the cleaning target and transmits a clean signal indicating that the cleaning target is in the clean state to the vehicle control unit 3 (step S25). In this example, as shown in FIG. 11, the cleaner control unit 116 stops the operations of the front pump 112, the right LC 105 and the third solenoid valve 23, and transmits a clean signal SC2 indicating that the right LiDAR 6r is in the clean state to the vehicle control unit 3, based on determination dial the right LiDAR 6r is in the clean state.

Next, the cleaner control unit 116 determines whether the operation stop time period of the front pump 112 has elapsed (step S26).

In step S26, when the operation stop time period of the front pump 112 is determined to have elapsed (Yes in step S26), the cleaner control unit 116 determines whether there is another cleaning target (step S27). When there is determined to be no cleaning target (No in step S27), the cleaner control unit 116 ends the processing.

On the other hand, when there is determined to be a cleaning target (Yes in step S27), the processing returns to step S19, and the cleaner control unit 116 determines a next cleaning target, that is, a third cleaning target, based on a control signal received from the vehicle control unit 3. In this example, in step S25, the clean signal SC2 indicating that the right LiDAR 6r is in the clean state is transmitted to the vehicle control unit 3. Therefore, control signals SG7 to SG10 received from the vehicle control unit 3 after the clean signal SC2 is transmitted to the vehicle control unit 3 include information on the front LiDAR 6f that requires further cleaning and the left LiDAR 6l that has not been cleaned. However, as shown in FIG. 11, when the operation stop time period of the front pump 112 has elapsed, a cleaning prohibition time period for prohibiting cleaning the front LiDAR 6f has not elapsed. Therefore, in this example, the cleaner control unit 116 does not determine the front LiDAR 6f having the highest priority as the third cleaning target, but determines the left LiDAR 6l as the third cleaning target.

Thereafter, the cleaner control unit 116 performs the processing of steps S23 to S27 on the left LiDAR 6l serving as the third cleaning target determined in step S19. In this example, the cleaner control unit 116 starts cleaning the left LiDAR 6l according to a control signal SG8. When the left LiDAR 6l is in a clean state, as shown in FIG. 11, the cleaner control unit 116 stops the operations of the front pump 112, the left LC 106 and the fourth solenoid valve 24, and transmits a clean signal SC3 indicating that the left LiDAR 6l is in the clean state to the vehicle control unit 3.

As described above, in this example, the signal SC3 indicating that the left LiDAR 6l is in the clean state is transmitted to the vehicle control unit 3. Therefore, control signals SG11 to SG15 received from the vehicle control unit 5 after the clean signal SC3 is transmitted to the vehicle control unit 3 include only information on the front LiDAR 6f that needs further cleaning. However, as shown in FIG. 11, when the operation stop time period of the front pump 112 has elapsed, a cleaning prohibition time period for prohibiting cleaning the front LiDAR 6f has not elapsed. Therefore, the cleaner control unit 116 determines the front LiDAR 6f as a fourth cleaning target and waits until the cleaning prohibition time period of the front LiDAR 6f elapses. Then, after the clearing prohibition time period of the front LiDAR 6f has elapsed, the cleaner control unit 116 resumes cleaning the front LiDAR 6f. When cleaning of the front LiDAR 6f is completed, there is no cleaning target to be cleaned in step S27, and thus the cleaner control unit 116 ends the processing.

As described above, the cleaner control unit 116 according to the second embodiment sets the priority order of an operation order of the solenoid valves 22 to 24 corresponding to the plurality of cleaner units according to attributes of the plurality of cleaner units, and sets the cleaning prohibition time period for stopping cleaning of each of the plurality of cleaner units. When an instruction signal for permitting cleaning of two or more cleaner units including one cleaner unit (an example of a first cleaner unit) among the plurality of cleaner units is received during the cleaning prohibition time period associated with the one cleaner unit, the cleaner control unit 116 permits an operation of the solenoid valve corresponding to one of the other cleaner units having the highest priority among the two or more cleaner units except the one cleaner unit. In order to prevent overheating of each solenoid valve and deterioration of functions of an in-vehicle camera and an in-vehicle sensor serving as cleaning targets, the cleaning prohibition time period for stopping cleaning of each cleaner unit may be set. However, when cleaning of all the cleaner units is stopped during the cleaning prohibition time period of each cleaner unit, the time until cleaning of all the cleaner units is completed increases. Therefore, according to the cleaner system of the second embodiment, even during the cleaning prohibition time period of one cleaner unit among the plurality of cleaner units, the operation of the solenoid valve corresponding to the cleaner unit having the next highest priority is permitted, so that the plurality of cleaning targets can be efficiently cleaned in a short time.

The cleaner control unit 116 according to the present embodiment may set the operation stop time period for stopping the operation of the front pump 112, and may permit the operation of the solenoid valve corresponding to the cleaner unit having the highest priority after the operation stop time period has elapsed. In this way, by permitting the operation of the solenoid valve corresponding to the clearer unit having the highest priority after the operation stop time period for waiting for heat radiation of the front pump 112 has elapsed, it is possible to efficiently clean the plurality of cleaning targets while preventing overheating of the front pump 112.

Similarly to the first embodiment, the cleaner control unit 116 according to the second embodiment preferably permits the operations of the solenoid valves 22 to 24 such that timings of the operations of the solenoid valves 22 to 24 do not overlap. Thereby, a decrease in cleaning performance caused by a decrease in a water pressure of the cleaning fluid due to simultaneous cleaning can be prevented.

Third Embodiment

Next, a cleaner system according to a third embodiment will be described with reference to FIGS. 12 and 13.

FIG. 12 shows a priority order table Tb1 stored in the cleaner control unit 116 according to the third embodiment. FIG. 13 is a flowchart showing an example of processing executed by the cleaner control unit 116 according to the third embodiment.

In the third embodiment, the cleaner control unit 116 stores the priority order table Tb1 that defines a priority order of operations of cleaner units (see FIG. 12). As shown in FIG. 12, the priority order table Tb1 includes, for example, a priority order of operations of the cleaner units in a plurality of modes A to D. For example, the mode A is a standard (default) priority order, and for example, the priority order is defined in an order of the front WW 101, the rear WW 102, the front LC 103, the rear LC 104, the right LC 105, the left LC 106, the right HC 107, the left HC 108, the front CC 109a and the rear CC 109b.

In the priority order table Tb1, as the modes B to D, priority orders different from those of the mode A are defined according to a situation of a vehicle. For example, when the vehicle is moving forward, it is highly necessary to prioritize cleaning of components on a front surface side of the vehicle over cleaning of components on a side surface side or a rear surface side of the vehicle. Therefore, in the mode B (a forward movement), for example, the priority order is defined in an order of the front WW 101, the front LC 103, the front CC 109a, the right LC 105, the left LC 106, the right HC 107, the left HC 108, the rear WW 102, the rear 104 and the rear CC 109b. On the other hand, when the vehicle is moving reversely, it is highly necessary to prioritize cleaning of components on the rear surface side of the vehicle over cleaning of components on the front surface side or the side surface side of the vehicle. Therefore, in the mode C (a reverse movement), for example, the priority order is defined in an order of the rear WW 102, the rear LC 104, the rear CC 109b, the right LC 105, the left LC 106, the right HC 107, the left HC 108, the front WW 101, the front LC 103 and the front CC 109a. In a case of rainy weather, particularly when traveling in an automatic driving mode, it is necessary to prioritize cleaning of the external sensor 6 (a camera or a LiDAR). Therefore, in a case of the mode D (the rainy weather (automatic driving)) shown in FIG. 12, for example, the priority order is defined in an order of the front CC 109a, the rear CC 109b, the front LC 103, the rear LC 104, the right LC 105, the left LC 106, the right HC 107, the left HC 108, the front WW 101 and the rear WW 102.

Next, the processing executed by the cleaner control unit 116 according to the third embodiment will be described with reference to FIG. 13.

First, as shown in FIG. 13, the cleaner control unit 116 receives a control signal from the vehicle control unit 3 (step S31).

Next, the cleaner control unit 116 determines whether the control signal received from the vehicle control unit 3 includes information on the priority order of the operations of the cleaner units (step S32).

In step S32, when the control signal received from the vehicle control unit 3 is determined to include the information on the priority order (Yes in step S32), the cleaner control unit 116 operates each cleaner unit based on the priority order (an example of a first priority order) designated by the vehicle control unit 3 (step S33). For example, when the priority order designated by the vehicle control unit 3 is the front WW 101, the front LC 103, the front CC 109a, the rear WW 102, the rear LC 104, the rear CC 109b, the right LC 105, the left LC 106, the right HC 107 and the left HC 108, the cleaner control unit 116 operates each cleaner unit in the designated priority order.

On the other hand, when the control signal received from the vehicle control unit 3 is determined not to include the information on the priority order of the operations of the cleaner units (No in step S32), the cleaner control unit 116 determines whether the control signal received from the vehicle control unit 3 includes information on a situation of the vehicle 1 (step S34). The situation of the vehicle 1 may include a situation around the vehicle 1 (weather, a road situation and the like) in addition to a traveling direction and a traveling speed of the vehicle 1.

In step S34, when the control signal is determined not to include the situation related to the situation of the vehicle 1 (No in step S34), the cleaner control unit 116 operates each cleaner unit based on the priority order of the mode A (a standard) defined in the priority order table Tb1 (step S35). Specifically, the cleaner control unit 116 operates the cleaner units in the order of the front WW 101, the rear WW 192, the front LC 103, the rear LC 104, the right LC 105, the left LC 106, the right HC 107, the left HC 108, the front CC 109a and the rear CC 109b based on the mode A shown in FIG. 12.

On the other hand, when the control signal is determined to include the information on the situation of the vehicle 1 (Yes in step S34), the cleaner control unit 116 selects any one of the plurality of modes B to D defined in the priority order table Tb1 based on the information on lire situation of the vehicle 1 included in the control signal (step S36). For example, when information indicating that the vehicle 1 is traveling forward is included in the control signal, the cleaner control unit 116 selects the mode B (the forward movement) among the plurality of modes B to C defined in the priority order table Tb1. When the control signal includes information indicating that the vehicle 1 is traveling reversely, the cleaner control unit 116 selects the mode C (the reverse movement). Further, when the control signal includes information indicating that an area around the vehicle 1 is rainy, the cleaner control unit 116 selects the mode D (the rainy weather).

Next, the cleaner control unit 116 sequentially operates each cleaner unit based on the priority order in the mode selected in step S36 (step S37). For example, when the mode B (the forward movement) is selected, the cleaner control unit 116 operates the cleaner units in the order of the front WW 101, the front LC 103, the front CC 109a, the right LC 105, the left LC 106, the right HC 107, the left HC 108, the rear WW 102, the rear LC 104 and lire rear CC 109b.

As described above, the cleaner control unit 116 according to the third embodiment controls the operation of each solenoid valve based on one of the priority order (the example of the first priority order) set by the vehicle control unit 3 to determine the operation order of the plurality of cleaner units and the priority order (an example of a second priority order) set by the cleaner control unit 116 to determine the operation order of the plurality of cleaner units. According to such a configuration, it is possible to change the priority order of cleaning of the plurality of cleaner units according to the system mounted on the vehicle 1, the situation of the vehicle 1, and the like. Thereby, the plurality of cleaning targets can be cleaned in a suitable operation order.

The cleaner control unit 116 according to the present embodiment is configured such that, when there is a priority order designated by the vehicle control unit 3, the priority order is prioritized over a priority order (for example, the priority order table Tb1) defined by the cleaner control unit 116. In addition, the cleaner control unit 116 is configured to select a predetermined priority order defined in the priority order table Tb1 when the priority order is not designated by the vehicle control unit 3. By preferentially selecting the priority order set by the vehicle control unit 3 that controls the entire vehicle 1 over the priority order set by the cleaner control unit 116, cleaning can be performed in the operation order according to a situation of the entire vehicle 1.

Even when there is a priority order designated by vehicle control unit 3, cleaning of the plurality of cleaner units may be designated at the same priority in the priority order. In this way, when the vehicle control unit 3 designates cleaning of the plurality of cleaner units at the same priority, the cleaner control unit 116 selects a predetermined priority order defined in the priority order table Tb1 and controls the operation of each solenoid valve.

The priority order table Tb1 set by the cleaner control unit 116 includes a plurality of priority orders (for example, the modes A to D in FIG. 12) having different operation orders according to the situation of the vehicle 1. The cleaner control unit 116 may select one of the plurality of modes A to D according to the information on the situation of the vehicle 1 received from the vehicle control unit 3. According to this configuration, more efficient cleaning can be performed by selecting a suitable mode among the plurality of modes according to the vehicle situation.

Similarly to the first embodiment, the cleaner control unit 116 according to the third embodiment preferably permits the operations of the solenoid valves such that timings of the operations of the solenoid valves do not overlap. Thereby, a decrease in cleaning performance caused by a decrease in a water pressure of the cleaning fluid due to simultaneous cleaning can be prevented.

Fourth Embodiment

Next, a cleaner system according to a fourth embodiment will be described with reference to FIG. 14.

Figure 14:
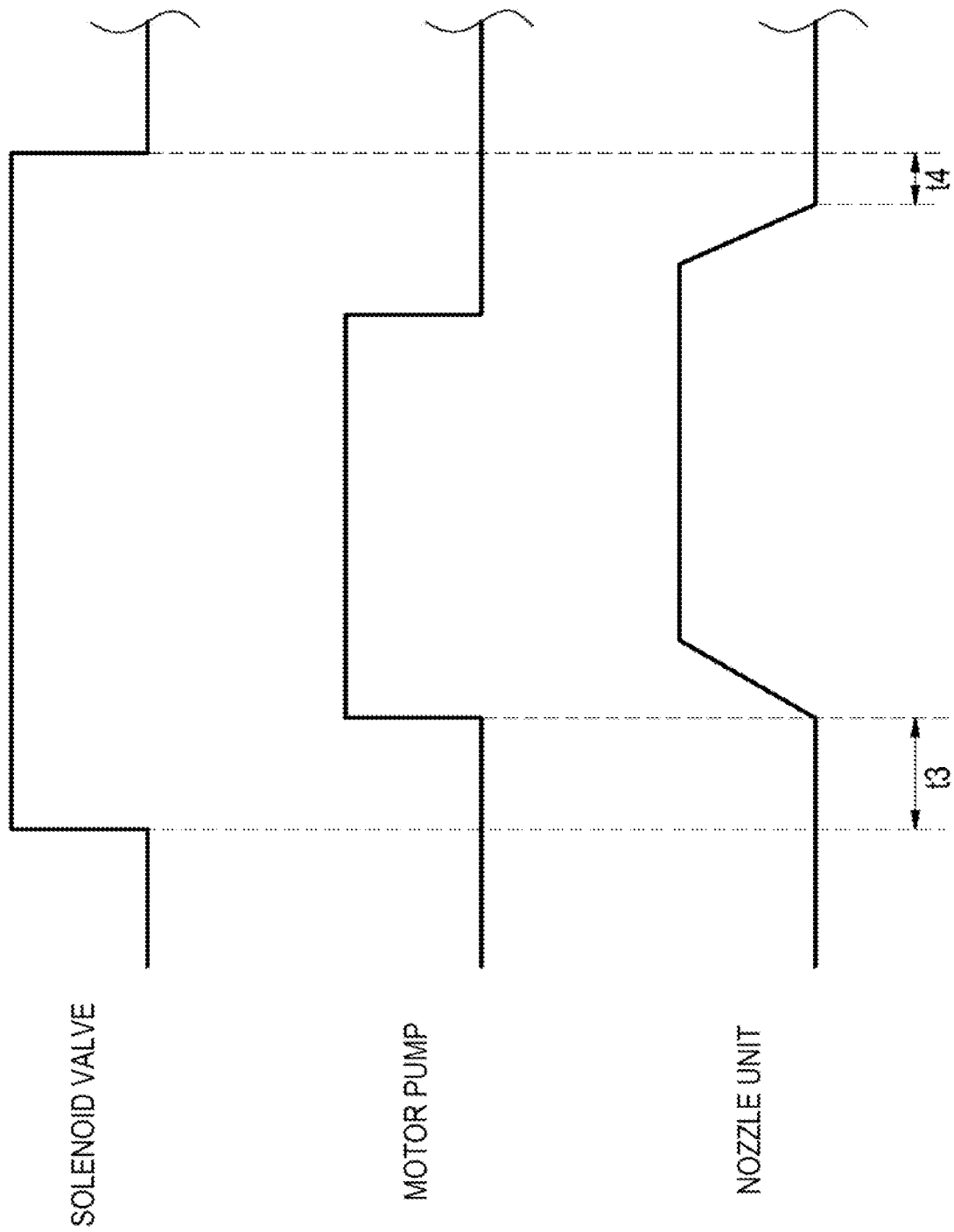
FIG. 14 is a timing chart schematically showing operation timings of a solenoid valve, a motor pump and a nozzle unit in a fourth embodiment.

FIG. 14 is a timing chart schematically showing operation timings of a solenoid valve, a motor pump and a nozzle unit in the fourth embodiment.

A cleaner unit used in the fourth embodiment includes a so-called pop-up type nozzle unit. The pop-up type nozzle unit includes a cylinder formed in a cylindrical shape, a piston slidably supported inside the cylinder, a nozzle provided at a tip end of the piston, and the like. When an operation of the motor pump such as the front pump 112 is started, an internal pressure in the cylinder increases, and thus the piston having the nozzle at the tip end thereof protrudes from the cylinder. On the other hand, when the operation of the motor pump is stopped, the internal pressure in the cylinder decreases, and thus the piston is accommodated in the cylinder. In this way, by starting and stopping the operation of the motor pump, the piston having the nozzle can advance and retract with respect to the cylinder.

In the present embodiment, when a control signal for operating the cleaner unit is received from the vehicle control unit 3, the cleaner control unit 116 first starts an opening operation of the solenoid valve as shown in FIG. 14. Subsequently, the cleaner control unit 116 starts the operation of the motor pump after a certain time period (for example, a certain time period t3 in FIG. 14) has elapsed from a start time point of the opening operation of the solenoid valve. When the operation of the motor pump is started, the internal pressure in the cylinder of the nozzle unit increases, and the piston gradually protrudes from the cylinder. When the piston completely protrudes from the cylinder, a cleaning fluid is discharged from the nozzle provided at the tip end of the piston toward a cleaning target.

Thereafter, the cleaner control unit 116 stops the operation of the motor pump after continuing the discharge of the cleaning fluid from the nozzle unit for a certain time period. When the operation of the motor pump is stopped, the internal pressure in the cylinder of the nozzle unit decreases, and the piston is gradually accommodated into the cylinder. Due to an influence of a residual pressure and an inertial force corresponding to a length of a hose from the motor pump to the nozzle unit, the operation of the motor pump is stopped, and the piston starts to be accommodated in the cylinder after the certain time period has elapsed. Next, the cleaner control unit 116 starts a closing operation of the solenoid valve after the certain time period (for example, a certain time period t4 in FIG. 14) has elapsed since the piston is completely accommodated in the cylinder.

As described above, the cleaner control unit 116 according to the fourth embodiment starts the operation of the motor pump after the certain time period has elapsed since the opening operation of each solenoid valve is started. If the operation of the motor pump is started before the solenoid valve is opened, an internal pressure in a pipe between the motor pump and the solenoid valve increases, which may lead to damage or water leakage of the solenoid valve. In this case, each solenoid valve has to be enlarged in order to improve pressure resistance. In contrast, in the present embodiment, since an increase in the internal pressure can be prevented by starting the operation of the motor pump after opening each solenoid valve, damage to each solenoid valve can be prevented even when the solenoid valve is miniaturized.

The cleaner control unit 116 according to the present embodiment starts the operation of the motor pump after the opening operation of the solenoid valve is completed. Thereby, miniaturization of the solenoid valve can be further promoted, and the damage to the solenoid valve can be more reliably prevented.

The cleaner control unit 116 according to the present embodiment starts the closing operation of the solenoid valve after the certain time period has elapsed since the operation of the motor pump is stopped after the opening operation of the solenoid valve is started and the operation of the motor pump is started. If the closing operation of the solenoid valve is started before the operation of the motor pump is stopped in a state in which the motor pump and the solenoid valve are operated, the internal pressure in the pipe between the motor pump and the solenoid valve increases, which may lead to damage or water leakage of the solenoid valve. In this case, the solenoid valve has to be enlarged in order to improve pressure resistance. In contrast, in the present embodiment, since the increase in the internal pressure can be prevented by starting the closing operation of the solenoid valve after stopping the operation of the motor pump, the damage to the solenoid valve can be presented even when the solenoid valve is miniaturized.

The cleaner control unit 116 according to the present embodiment preferably starts the closing operation of the solenoid valve after the piston of the nozzle unit is completely accommodated in the cylinder (that is, after accommodation of the piston in the cylinder is completed). In the cleaner unit according to the present embodiment, the pop-up type nozzle unit is used, but when the solenoid valve is closed before the piston is completely accommodated in the cylinder, the internal pressure in the cylinder may not completely decrease and the piston may not be completely accommodated in the cylinder. Therefore, in the present embodiment, by starting the closing operation of the solenoid valve after the piston is completely accommodated in the cylinder, the accommodation of the piston in the cylinder after the operation of the motor pump is stopped can be sufficiently ensured.

In the fourth embodiment, the cleaner unit including the pop-up type nozzle unit is described as an example, but the nozzle unit may not be a pop-up type. That is, the nozzle unit may have a configuration in which the cleaning fluid is injected toward the cleaning target by a discharge pressure of the motor pump when the operation of the motor pump is started, and injection of the cleaning fluid is stopped when the discharge pressure of the motor pump is lost, that is, when the motor pump is stopped. When the solenoid valve is closed simultaneously with a stop of the operation of the motor pump or immediately after the stop of the operation of the motor pump, the internal pressure in the pipe between the motor pump and the solenoid valve increases due to the influence of the residual pressure due to the inertial force, which may lead to damage or water leakage of the solenoid valve, and the solenoid valve has to be enlarged. Therefore, it is preferable to close the solenoid valve after the residual pressure due to inertia becomes normal after the operation of the motor pump is stopped.

Various Modifications

Although the embodiments of the present disclosure have been described above, it is needless to say that the technical scope of the present disclosure should not be construed as being limited by the description of the embodiments. It is to be understood by those skilled in the art that the present embodiments are merely examples and various modifications may be made within the scope of the invention described in the claims. The technical scope of the present disclosure should be determined based on the scope of the invention described in the claims and the scope of equivalents thereof. That is, the present disclosure is not limited to the embodiments described above, and may be appropriately modified, improved, and the like. Materials, shapes, dimensions, numerical values, forms, numbers, arrangement places and the like of components in the embodiments described above can be set freely and are not limited as long as the present disclosure can be achieved.

In the present embodiments, the driving mode of the vehicle includes the fully automatic driving mode, the advanced driving support mode, the driving support mode and the manual driving mode, but the driving mode of the vehicle should not be limited to these four modes. The driving mode of the vehicle may include at least one of these four modes. For example, only one driving mode of the vehicle may be executable.

Further, classification and a display form of the driving mode of the vehicle may be appropriately changed according to laws or regulations related to automatic driving in each country. Similarly, definitions of the "fully automatic driving mode", the "advanced driving support mode" and the "driving support mode" described in the description of the present embodiments are merely examples, and these definitions may be appropriately changed according to the laws or regulations related to the automatic driving in each country.

An example in which the cleaner system 100 is mounted on the vehicle capable of automatic driving has been described in the embodiments described above, but the cleaner system 100 may be mounted on a vehicle incapable of automatic driving.

An example in which the cleaners 101, 103, 105 to 109*a* are connected to the front tank 111 and the cleaners 102, 104, 109*b* are connected to the rear tank 113 has been described in the embodiments described above, but the present disclosure is not limited thereto.

The cleaners 101 to 109*b* way be connected to a single tank. The cleaners 101 to 109*b* may be connected to different tanks.

Alternatively, the cleaners 101 to 100*b* may be connected to a common tank for each type of the cleaning target. For example, the cleaners 103 to 106 that clean the LiDARs may be connected to a common first tank, and the cleaners 107, 108 that clean the headlamps may be connected to a second tank different from the first tank.

Alternatively, the cleaners 101 to 109*b* may be connected to a common tank for each arrangement position of the cleaning target. For example, the front WW 101, the front LC 103 and the front CC 109*a* may be connected to a common front tank, the right LC 105 and the right HC 107 may be connected to a common right tank, the rear WW 102, the rear LC 104 and the rear CC 109*b* may be connected to a common rear tank, and the left LC 106 and the left HC 108 may be connected to a common left tank.

As shown in FIG. 3, an example in which the cleaners that clean the front pump, the front WW, the front LC, the right LC, the left LC, the right HC, the left HC and the front CC constitute one unit, and the cleaners that clean the rear pump, the rear CC, the rear LC and the rear WW constitute another unit, has been described in the embodiments described above. The present disclosure is not limited thereto. An order in which the cleaning targets are connected to the front pump and the rear pump is not limited to this example. As shown in FIG. 3, an example in which one cleaner is connected downstream of one solenoid valve has been described in the embodiments described above. The present disclosure is not limited thereto. A plurality of cleaners may be connected downstream of one solenoid valve. A plurality of cleaners, which clean the cleaning targets that are often cleaned simultaneously, may be connected downstream of one solenoid valve.

The present application is based on Japanese Patent Application No. 2019-17922 filed on Feb. 4, 2019, Japanese Patent Application No. 2019-17923 filed on Feb. 4, 2019, Japanese Patent Application No. 2019-17924 filed on Feb. 4, 2019, and Japanese Patent Application No. 2019-17925 filed on Feb. 4, 2019, the contents of which are incorporated herein by reference.

The invention claimed is:

1. A vehicle cleaner system comprising:
a cleaner unit configured to discharge a cleaning fluid toward a cleaning target mounted on a vehicle;
a motor pump configured to supply the cleaning fluid to the cleaner unit;
a normally closed type solenoid valve provided between the cleaner unit and the motor pump and configured to switch between permission and non-permission of movement of the cleaning fluid from the motor pump to the cleaner unit; and
a cleaner control unit configured to control the motor pump and the solenoid valve,
wherein the cleaner control unit waits for a predetermined time period to elapse since an operation of the motor pump is stopped after an opening operation of the solenoid valve is started and the operation of the motor pump is started and starts a closing operation of the solenoid valve after the predetermined time period has elapsed
wherein the cleaner unit includes a cylinder, a piston supported so as to be capable of advancing and retracting with respect to the cylinder, and a nozzle provided at a tip end of the piston and configured to inject the cleaning fluid toward the cleaning target in a state in which the piston protrudes from the cylinder,
wherein the piston protrudes from the cylinder when the motor pump is operated, and is accommodated in the cylinder when the operation of the motor pump is stopped, and
wherein the predetermined time period is from when the operation of the motor pump is stopped to when accommodation of the piston in the cylinder is completed.

* * * * *